United States Patent
Yang et al.

(10) Patent No.: US 11,736,997 B2
(45) Date of Patent: Aug. 22, 2023

(54) LINK DETERMINATION AND ESTABLISHMENT METHOD AND APPARATUS, TRANSMISSION SYSTEM, AND SATELLITE COMMUNICATION SYSTEM

(71) Applicant: ZTE Corporation, Shenzhen (CN)

(72) Inventors: Li Yang, Shenzhen (CN); Jianwu Dou, Shenzhen (CN); Wei Cao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 275 days.

(21) Appl. No.: 17/298,100

(22) PCT Filed: Sep. 2, 2019

(86) PCT No.: PCT/CN2019/103954
§ 371 (c)(1),
(2) Date: May 28, 2021

(87) PCT Pub. No.: WO2020/107982
PCT Pub. Date: Jun. 4, 2020

(65) Prior Publication Data
US 2022/0046501 A1 Feb. 10, 2022

(30) Foreign Application Priority Data
Nov. 29, 2018 (CN) .......................... 201811446251.7

(51) Int. Cl.
*H04W 36/00* (2009.01)
*H04W 76/15* (2018.01)
(Continued)

(52) U.S. Cl.
CPC . *H04W 36/00837* (2018.08); *H04W 36/0069* (2018.08); *H04W 36/30* (2013.01); *H04W 76/15* (2018.02); *H04W 84/06* (2013.01)

(58) Field of Classification Search
None
See application file for complete search history.

(56) References Cited

U.S. PATENT DOCUMENTS

| | | | |
|---|---|---|---|
| 2017/0222713 A1 | 8/2017 | Damnjanovic | |
| 2020/0052782 A1* | 2/2020 | Wang | H04W 76/27 |

FOREIGN PATENT DOCUMENTS

| | | |
|---|---|---|
| CN | 101138169 A | 3/2008 |
| CN | 101808380 A | 8/2010 |
| WO | 2005070385 A1 | 8/2005 |

OTHER PUBLICATIONS

International Search Report for corresponding application PCT/CN2019/103954 filed Sep. 2, 2019; dated Dec. 5, 2019.
(Continued)

*Primary Examiner* — Suhail Khan
(74) *Attorney, Agent, or Firm* — Cantor Colburn LLP

(57) ABSTRACT

A link determination and establishment method and apparatus are provided. In the link determination method, a ground serving base station of User Equipment (UE) receives, from an air serving base station of the UE, link information of a primary link and configuration information of the air serving base station; the ground serving base station determines at least one cooperative base station of the UE and feature information of at least one secondary link according to the link information of the primary link and the configuration information of the air serving base station; and the ground serving base station sends, to the air serving base station and the at least one cooperative base station, indication information for establishing the at least one secondary link, the link information of the primary link, and configuration information of the ground serving base station.

14 Claims, 11 Drawing Sheets

(51) Int. Cl.
*H04W 36/30* (2009.01)
*H04W 84/06* (2009.01)

(56) References Cited

OTHER PUBLICATIONS

Thales et al., "3GPP TSG RAN WG3 Meeting #102", NTN Architecture with Regenerative Satelitte R3-187112, Nov. 16, 2018.
Thales et al., "3GPP TSG SA2 Meething #116bis S2-164818", Intergration of Satellite in the Next Generation System Architecture, Sep. 2, 2016.

* cited by examiner

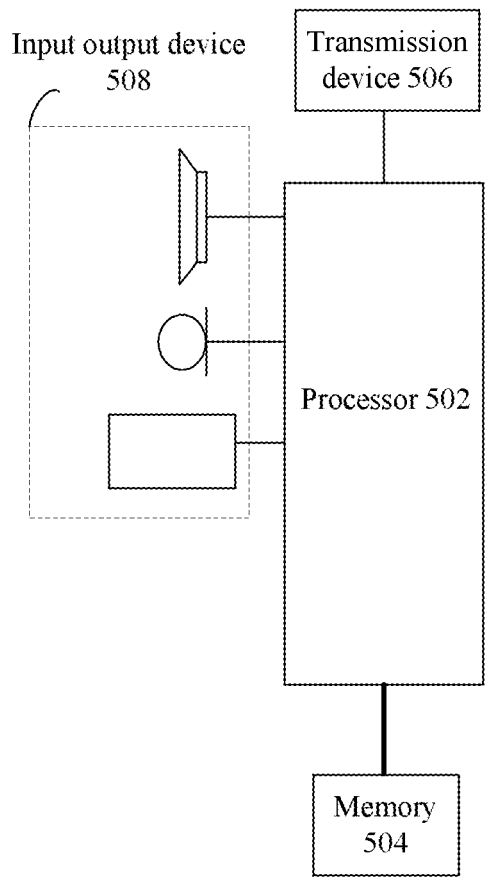

Fig. 5

A ground serving base station of a UE receives, from an air serving base station of the UE, link information of a primary link and configuration information of the air serving base station, wherein the primary link is a link between the ground serving base station and the air serving base station — S602

The ground serving base station determines at least one cooperative base station of the UE and feature information of at least one secondary link according to the link information and the configuration information of the air serving base station, wherein the secondary link is a link among the air serving base station, the cooperative base station and the ground serving base station — S604

The ground serving base station sends, to the air serving base station and the at least one cooperative base station, indication information for establishing the at least one secondary link, the link information of the primary link, and configuration information of the ground serving base station — S606

Fig. 6

LINK DETERMINATION AND ESTABLISHMENT METHOD AND APPARATUS, TRANSMISSION SYSTEM, AND SATELLITE COMMUNICATION SYSTEM

CROSS REFERENCE

This application is a National Stage Filing of the PCT International Application No. PCT/CN2019/103954 filed on Sep. 2, 2019, which claims priority to Chinese Application No. 201811446251.7 filed on Nov. 29, 2018, the entirety of which is herein incorporated by reference.

TECHNICAL FIELD

The present disclosure relates to the field of communications, and more particularly to a link determination method and apparatus, a link establishment method and apparatus, a transmission system, and a satellite communication system.

BACKGROUND

In the 4-Generation (4G) land-based or Long Term Evolution (LTE) cellular mobile communication system, two subsystems namely a 4G Evolved Packet Core (EPC) and a 4G Radio Access Network (RAN) are included. The 4G EPC includes basic network nodes such as a Mobility Management Entity (MME), a Serving Gateway (SGW) and a PDN Gateway (PGW). The 4G RAN includes an interface between an evolved Node B (eNB) and a related base station network element.

The Fifth-Generation 5G land-based cellular mobile communication system also includes two subsystems namely a 5 Generation Core (5GC) and a Next Generation Radio Access Network (NG-RAN). The 5GC includes network nodes such as an Access Mobility Function (AMF), a Session Management Function (SMF) and a User Plane Function (UPF). The NG-RAN includes at least two different base stations of a Radio Access Technology (RAT) type, that is, an ng-eNB (an E-UTRA RAT is still supported at an air interface) continuing to evolve based on a 4G eNB, a gNB (an air interface supports a New Radio (NR) RAT) designed based on a brand-new physical layer air interface, and an interface between related base station network elements. NG-RAN base stations (gNB or ng-eNB) are interconnected with the 5GC (including NG-C control plane (signaling) connections and NG-U user plane (user data) connections) through standardized NG interfaces, while NG-RAN base stations (gNB or ng-eNB) are interconnected through Xn interfaces (including Xn-C control plane connections and Xn-U user plane connections).

FIG. 1 is an architectural diagram of an Aggregated NG-RAN aggregated base station Central Unit/Distributed Unit (CU/DU) air interface protocol stack not disaggregated in the related art. FIG. 2 is an architectural diagram of a Disaggregated NG-RAN disaggregated base station gNB CU/DU air interface protocol stack disaggregated in the related art. Taking the currently supported gNB-CU/DU disaggregation as an example, a single gNB is disaggregated into a single gNB-CU and multiple gNB-DU network node entities which are mutually connected through a standardized F1 interface and also include an F1-C control plane connection and an F1-U user plane connection. External interfaces of the gNB after CU/DU disaggregation and the gNB without disaggregation are still NG and Xn interfaces. The control plane connections of the various interfaces are used for transmitting control signaling messages between network nodes, while the user plane connections are used for transmitting user traffic data (packets). NGAP, XnAP and F1AP are respectively NG-C, Xn-C and F1-C control plane RNL logical network application layer protocols, and control signaling of corresponding interfaces is transmitted based on a Transport Network Layer (TNL) transmission bearer (Stream Control Transmission Protocol (SCTP) connection) at a network lower layer; and NG-U, Xn-U and F1-U are user plane interfaces for user service data frames, and user service data (packets) of corresponding interfaces are transmitted based on a TNL transmission bearer (GTP-U (GPRS Tunneling Protocol, for the user plane) tunnel) at a network lower layer.

In traditional land-based ground cellular mobile networks, the deployments of various NG-RAN base stations are relatively static and fixed with respect to physical locations of specific longitudes and latitudes of the ground, so that radio coverage/capacity supply of air interface Uu serving cells provided by the NG-RAN base stations, and NG, Xn, F1 and other interfaces connecting these NG-RAN neighboring base stations are also fixed with respect to physical locations. TNL transmission bearers of NG, Xn, F1 and other interfaces are mostly realized through fixed network transmission modes such as broadband optical fibers, and therefore the robustness, delay performance, transmission efficiency and other aspects of network related interface connection are good. Such a relatively fixed land-based ground cellular mobile network is relatively easy for operator planning deployment and resource management, since all network nodes and network resources can be planned and managed in a (semi-) static manner. Under the fixed land-based ground cellular mobile network, along with the movement of a terminal User Equipment (UE), in order to maintain the continuity of user services, only the link mobility management problems of the terminal UE between different serving cells/base stations/network nodes, such as handover and relocation, need to be solved.

In recent years, with the advent of various types of mobile base stations or network nodes, such as ground vehicle-mounted mobile base stations, unmanned aerial vehicle base stations and space satellite communication base stations, air interface serving cell radio coverage/capacity supply provided by the mobile base station nodes generally changes along with the physical location movement of the mobile base stations, and TNL transmission bearers of NG, Xn and F1 related interfaces connecting the mobile base stations are not in a traditional fixed mode, and cannot be used for bearing in a fixed network manner such as a broadband optical fiber, generally relying on a variety of radio bearers, such as: microwave, laser, relay and other technical means. The cellular mobile network constructed by the mobile base station is more flexible in deployment, but network resources and TNL radio bearers can only be planned and managed in a relatively dynamic manner; otherwise, the network topology changes continuously along with the movement of each base station or network node, the quality of the TNL radio bearer may be unstable, the upper layers of the relevant interfaces of each network of the mobile base station are likely to become inefficient or even fail to provide service due to the deterioration of the quality of the underlying TNL radio bearer, and therefore various local resources of the mobile base station and other network nodes cannot be efficiently utilized by the mobile communication system; even some services serving UE groups are forced to be interrupted, etc.

As the mobile base station moves, the relevant network nodes need to update mutually relevant configurations synchronously in time, for example, physical coverage information of a current serving cell, association information of interfaces between network nodes and the like, so that smooth end-to-end radio links are ensured. FIG. 3 is a cell mapping relationship diagram of a mobile station in the related art. As shown in FIG. 3, it is assumed that there are multiple space-based mobile base stations which are respectively Moving nodes 1/2/3/4 . . . , each providing a service beam from the air to a specific ground area to form signal coverage of serving cells 1/2/3/4, respectively. However, as these base stations move collectively leftwards, physical coverage of the respective serving cells 1/2/3/4 . . . will also move leftwards continuously or in a skipping manner with the base stations, so that a mapping relationship between the base stations and a serving tracking area illustrated by the large ground ellipse also changes.

A radio link between a UE and a space-based mobile base station is called a service link. From the perspective of a single UE, even if the UE does not move, the service link changes as the base station moves, i.e. is forced to be updated from serving cell 1 to serving cell 2, otherwise the UE service is interrupted. FIG. 4 is a schematic diagram of a radio communication structure in the related art. As shown in FIG. 4, a radio link between a space-based mobile base station and a ground serving station (for example, an upstream control network node such as a satellite gateway and core network) is called a feeder link, which is used for a further end-to-end connection between a service link and a ground network, thereby enabling the interactive transmission of signaling data between the UE and the ground network. Ground stations are typically planned and deployed in specific physical locations on the ground and are relatively fixed, so the feeder link between the ground stations and the ground serving station actually changes as the space-based mobile base station moves. For example, when the mobile base station moves to a particular location, it needs to disconnect an old feeder link with the current ground serving station and establish a new feeder link with a new target ground serving station, or the mobile base station establishes and maintains multiple feeder links with multiple ground serving stations simultaneously.

The service link is oriented to a UE to be served and directly bears user service data packets and RRC signaling on a 5G NR Uu air interface, and the feeder link at least needs to provide a TNL transmission function between certain network nodes. The feeder link may also be used for transmitting user service data packets and protocol flow signaling on different network interfaces of a traditional ground cellular network according to different mobile base station architectures and function distributions, such as, GTP-U user service data packets and NGAP, XnAP and F1AP protocol signaling data packets. Due to the regular or random irregular movement of the mobile base station, the feeder link based on a radio TNL transport bearer is in fact less robust and efficient than in the case of traditional ground cellular networks. In the moving process of the mobile base station, in addition to maintaining a stable and efficient radio TNL transmission bearer with a single or multiple ground serving stations, reliable and efficient transmission of user service data packets and interface flow signaling needs to be ensured. Since once the transmission of data and signaling over the feeder transmission link has an error or becomes inefficient, all the transmission performance associated with the subsequent service link becomes meaningless.

SUMMARY

The embodiments of the present disclosure provide a link determination method and apparatus, a link establishment method and apparatus, a transmission system, and a satellite communication system, which can solve at least the problem in the related art that when a feeder link fails or has an error, the whole link system falls down.

According to some embodiments of the present disclosure, a link determination method is provided, which may include the following operations. A ground serving base station of a UE receives, from an air serving base station of the UE, link information of a primary link and configuration information of the air serving base station, wherein the primary link is a link between the ground serving base station and the air serving base station. The ground serving base station determines at least one cooperative base station of the UE and feature information of at least one secondary link according to the link information of the primary link and the configuration information of the air serving base station, wherein the secondary link is a link among the air serving base station, the cooperative base station and the ground serving base station. The ground serving base station sends, to the air serving base station and the at least one cooperative base station, indication information for establishing the at least one secondary link, the link information of the primary link, and configuration information of the ground serving base station.

According to another embodiment of the present disclosure, a link establishment method is provided, which may include the following operations. An air serving base station of a UE sends, to a ground serving base station of the UE, link information of a primary link and configuration information of the air serving base station, wherein the primary link is a link between the ground serving base station and the air serving base station. The air serving base station receives link information of the primary link, configuration information of the ground serving base station, and indication information sent by the ground serving base station. The air serving base station establishes at least one secondary link with at least one cooperative base station and the ground serving base station according to the indication information sent by the ground serving base station. The air serving base station performs data or signaling transmission through the primary link and/or the at least one secondary link.

According to some embodiments of the present disclosure, another link determination method is provided, which may include the following operations. A cooperative base station of a UE establishes a secondary link with an air serving base station of the UE and a ground serving base station according to indication information sent by the ground serving base station of the UE. The cooperative base station performs data or signaling transmission with the air serving base station through the secondary link.

According to some embodiments of the present disclosure, a link determination apparatus is provided, which may be located in a ground serving base station of a UE and may include: a first receiving module, configured to receive, from an air serving base station of the UE, link information of a primary link and configuration information of the air serving base station, wherein the primary link is a link between the ground serving base station and the air serving base station; a determination module, configured to determine at least one cooperative base station of the UE and feature information of at least one secondary link according to the link information of the primary link and the configuration information of the air serving base station, wherein the secondary link is a link among the air serving base station, the cooperative base station and the ground serving base station; and a first sending module, configured to send, to the air serving base station and the at least one cooperative base station, indication information for establishing the at least one secondary link, the link information of the primary link, and configuration information of the ground serving base station.

According to another embodiment of the present disclosure, a link establishment apparatus is provided, which may be located in an air serving base station of a UE and may include: a second sending module, configured to send, to a ground serving base station of the UE, link information of a primary link and configuration information of the air serving base station, wherein the primary link is a link between the ground serving base station and the air serving base station; a second receiving module, configured to receive link information of the primary link, configuration information of the ground serving base station, and indication information sent by the ground serving base station; a first establishment module, configured to establish, according to the indication information sent by the ground serving base station, at least one secondary link with at least one cooperative base station and the ground serving base station; and a first transmission module, configured to perform data or signaling transmission through the primary link and/or the at least one secondary link.

According to some embodiments of the present disclosure, another link establishment apparatus is provided, which may be located in a cooperative base station of a UE and may include: a second establishment module, configured to establish, according to indication information sent by a ground serving base station of the UE, a secondary link with an air serving base station of the UE; and a second transmission module, configured to perform data or signaling transmission with the air serving base station through the secondary link.

According to another embodiment of the present disclosure, a transmission system is provided, which may perform data or signaling transmission through a radio bearer F1 interface. The transmission system may be configured to execute the operations in any one of the above method embodiments when running.

According to another embodiment of the present disclosure, another transmission system is provided, which may perform data or signaling transmission through a radio bearer NG interface. The transmission system may be configured to execute the operations in any one of the above method embodiments when running.

According to another embodiment of the present disclosure, a satellite communication system is provided, which may be applied to a transmission system for data or signaling transmission through a radio bearer F1 interface or NG interface.

According to another embodiment of the present disclosure, a storage medium is also provided. The storage medium may store a computer program that performs the operations in any one of the above method embodiments at runtime.

According to yet another embodiment of the present disclosure, an electronic device is also provided. The electronic device may include a memory and a processor. The memory may store a computer program. The processor may be configured to run the computer program to perform the operations in any one of the above method embodiments.

In the embodiments of the present disclosure, a ground serving base station can determine, according to a link situation and relevant information sent by the air serving base station, at least one cooperative base station and whether to establish, in a data or signaling transmission process, at least one secondary link between an air serving base station and the at least one cooperative base station for assisting a primary link in the data or signaling transmission. Through the embodiments of the present disclosure, the technical problem in the related art that once the transmission of data and signaling over a feeder transmission link has an error or becomes inefficient, all the transmission performance associated with the subsequent service link becomes meaningless can be solved, thereby improving the stability of the data and signaling transmission of the whole system, and enhancing the robustness and the data signaling transmission efficiency of the related interface connection of mobile network nodes.

BRIEF DESCRIPTION OF THE DRAWINGS

The accompanying drawings described herein are used to provide a further understanding of the present disclosure, and constitute a part of the present application, and the exemplary embodiments of the present disclosure and the description thereof are used to explain the present disclosure, but do not constitute improper limitations to the present disclosure. In the drawings:

FIG. 5 is a block diagram of a hardware structure of a mobile terminal of a link determination method according to some embodiments of the present disclosure;

FIG. 6 is a flowchart of a link determination method according to some embodiments of the present disclosure;

DETAILED DESCRIPTION OF THE EMBODIMENTS

Figure 1:
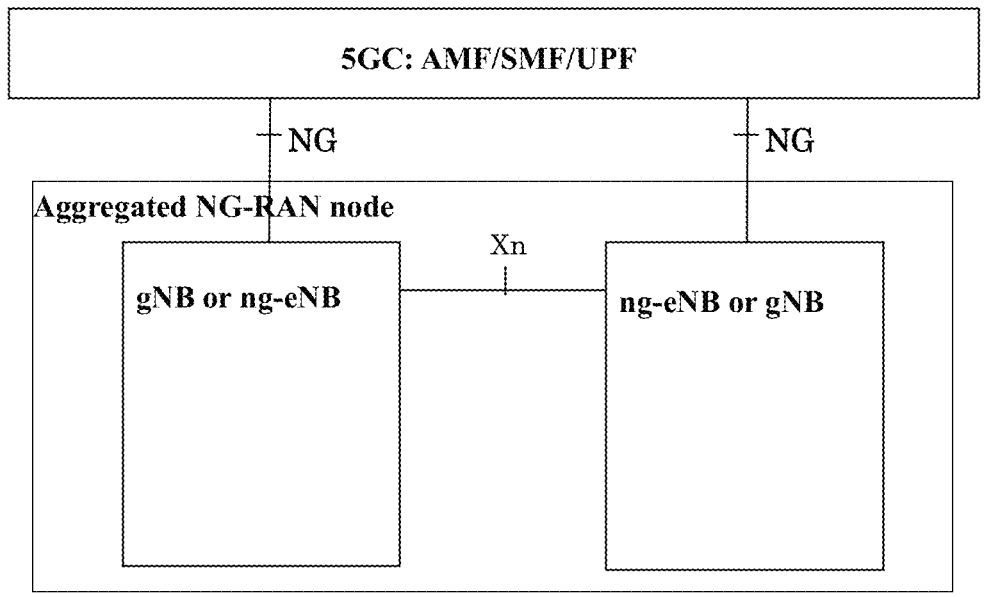
FIG. 1 is an architectural diagram of an Aggregated NG-RAN aggregated base station CU/DU air interface protocol stack not disaggregated in the related.
Figure 2:
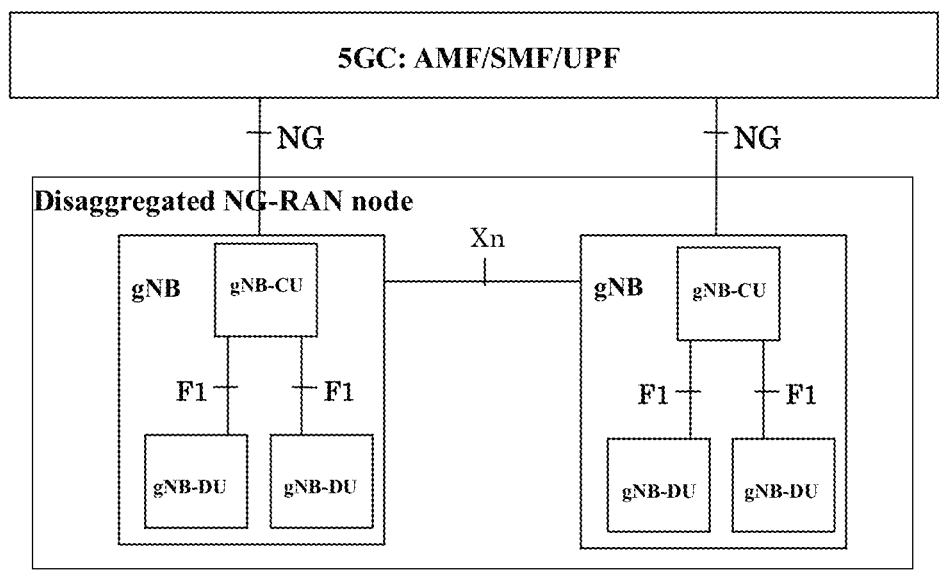
FIG. 2 is an architectural diagram of a Disaggregated NG-RAN disaggregated base station gNB CU/DU air interface protocol stack disaggregated in the related art.
Figure 3:
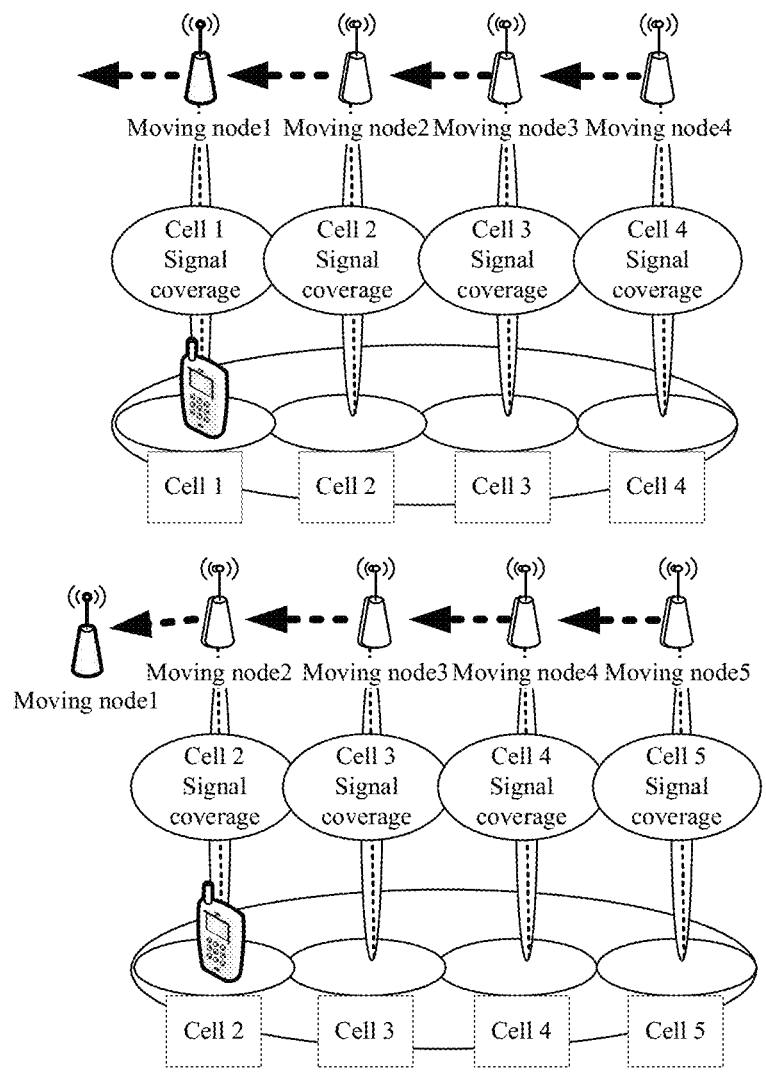
FIG. 3 is a cell mapping relationship diagram of a mobile station in the related art.
Figure 4:
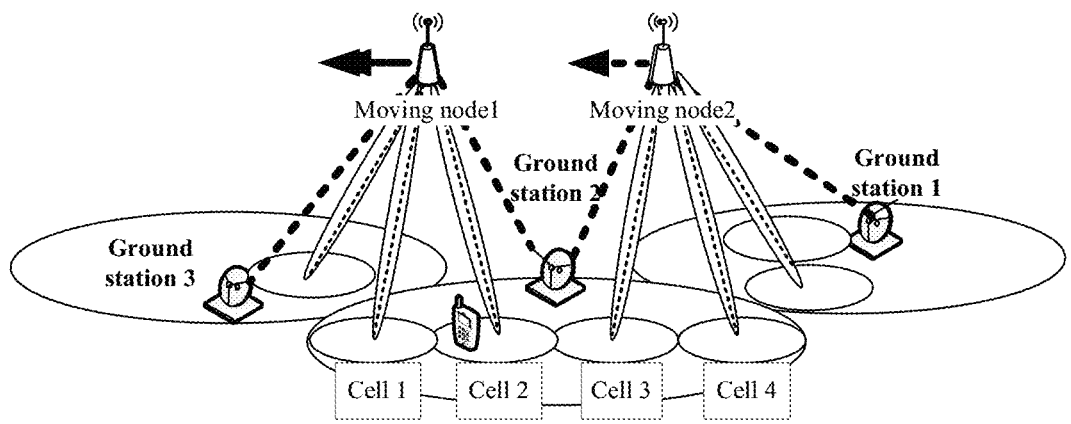
FIG. 4 is a schematic diagram of a radio communication structure in the related art.

The present disclosure is described below with reference to the drawings and in conjunction with the embodiments in detail. Embodiments in the present application and characteristics in the embodiments may be combined under the condition of no conflicts.

The specification and claims of the disclosure and the terms "first", "second" and the like in the drawings are used to distinguish similar objects, and do not need to describe a specific sequence or a precedence order.

The method embodiments may be executed in a mobile terminal, a computer terminal or a similar computing apparatus. Running on a mobile terminal is taken as an example. FIG. 5 is a block diagram of a hardware structure of a mobile terminal of a link determination method according to some embodiments of the present disclosure. As shown in FIG. 5, a mobile terminal 50 may include one or more (only one shown in FIG. 5) processor 502 (the processor 502 may include, but is not limited to, a processing apparatus such as a Micro Control Unit (MCU) or a Field Programmable Gate Array (FPGA) and a memory 504 configured to store data. In some exemplary implementations, the mobile terminal may further include a transmission device 506 configured as a communication function and an input output device 508. It will be understood by those having ordinary skill in the art that the structure shown in FIG. 5 is merely illustrative and does not limit the structure of the above mobile terminal. For example, the mobile terminal 50 may also include more or fewer components than shown in FIG. 5, or has a different configuration from that shown in FIG. 5.

The memory 504 may be configured to store a computer program, for example, a software program and module of application software, such as a computer program corresponding to a link determination method in the embodiments of the present disclosure. The processor 502 executes various functional applications and data processing, that is, implements the above method by running the computer program stored in the memory 504. The memory 504 may include a high speed random access memory and may also include a non-volatile memory such as one or more magnetic storage apparatuses, a flash memory, or other non-volatile solid state memories. In some examples, the memory 504 may further include memories remotely located relative to the processor 502, which may be connected to the mobile terminal 50 over a network. The examples of such networks include, but are not limited to, the Internet, the Intranet, local area networks, mobile communication networks, and combinations thereof.

The transmission apparatus 506 is configured to receive or send data over a network. The above specific network examples may include a wireless network provided by a communication provider of the mobile terminal 50. In one example, the transmission apparatus 506 includes a Network Interface Controller (NIC) that may be connected to other network devices through the base station to communicate with the Internet. In one example, the transmission apparatus 506 may be a Radio Frequency (RF) module for communicating with the Internet wirelessly.

A link determination method running on the above mobile terminal or network architecture is provided in some embodiments. FIG. 6 is a flowchart of a link determination method according to some embodiments of the present disclosure. As shown in FIG. 6, the flow includes the following operations.

In operation S602, a ground serving base station of a UE receives, from an air serving base station of the UE, link information of a primary link and configuration information of the air serving base station, wherein the primary link is a link between the ground serving base station and the air serving base station.

In operation S604, the ground serving base station determines at least one cooperative base station of the UE and feature information of at least one secondary link according to the link information of the primary link and the configuration information of the air serving base station, wherein the secondary link is a link among the air serving base station, the cooperative base station and the ground serving base station.

In operation S606, the ground serving base station sends, to the air serving base station and the at least one cooperative base station, indication information for establishing the at least one secondary link, the link information of the primary link, and configuration information of the ground serving base station.

In some exemplary implementations, the feature information of the at least one secondary link includes a type and the number of the at least one secondary link.

In some exemplary implementations, the operation that the ground serving base station determines the at least one cooperative base station of the UE and the feature information of the at least one secondary link may be implemented in the following manner. The ground serving base station judges whether link quality in the link information of the primary link meets a first quality threshold. In a case where the judgment result is negative, the ground serving base station determines a ground cooperative base station and a first secondary link between the air serving base station and the ground cooperative base station.

In some exemplary implementations, the operation that the ground serving base station determines the at least one cooperative base station of the UE and the feature information of the at least one secondary link may further include the following operations. The ground serving base station judges whether link quality in the link information of the primary link meets a second quality threshold, wherein the link quality corresponding to the second quality threshold is independent of and different from link quality corresponding to a first quality threshold. In a case where the judgment result is negative, the ground serving base station determines an air cooperative base station and a second secondary link between the air serving base station and the air cooperative base station.

In some exemplary implementations, the method may further include the following operation. In a case where the judgment result is positive, the ground serving base station sends, to the air serving base station, indication information indicating to perform data or signaling transmission through the primary link.

In some exemplary implementations, the method may further include the following operation. The ground serving base station determines a data or signaling transmission mode in the primary link and the at least one secondary link according to the link information of the primary link and the configuration information of the air serving base station.

In some exemplary implementations, the operation that the ground serving base station sends, to the air serving base station and the at least one cooperative base station, the indication information for establishing the at least one secondary link may be implemented in the following manner. The ground serving base station sends configuration information of the at least one cooperative base station and the data or signaling transmission mode to the air serving base station.

In some exemplary implementations, the data or signaling transmission mode includes one of the following: a duplicated transmission mode for instructing the air serving base station to simultaneously perform data or signaling transmission on the primary link and the at least one secondary link; and a switched transmission mode for instructing the air serving base station to select a link with highest link quality from the primary link and the at least one secondary link for data or signaling transmission.

In some exemplary implementations, the operation that the ground serving base station sends, to the air serving base station and the at least one cooperative base station, the indication information for establishing the at least one secondary link may further include the following operation. The ground serving base station sends configuration information of the air serving base station to the at least one cooperative base station.

Figure 7:
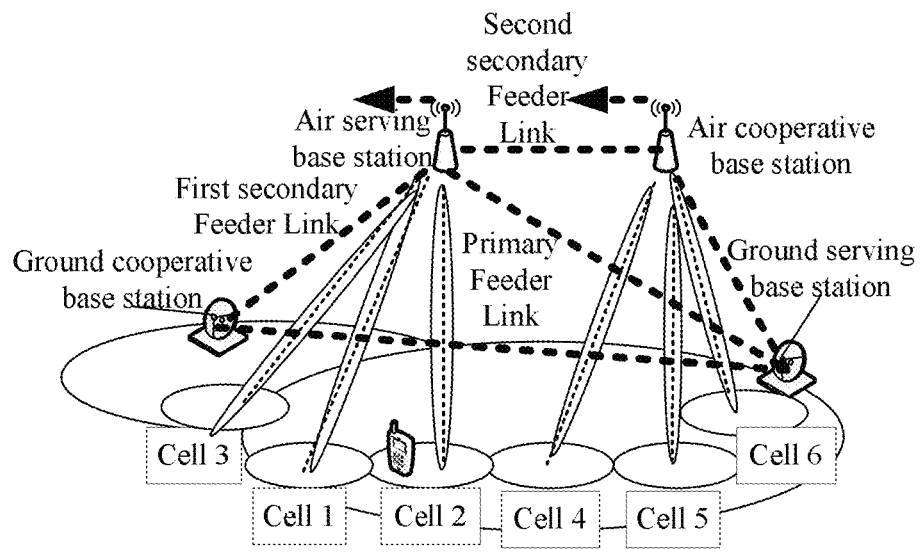
FIG. 7 is a schematic diagram of a link for data and signaling transmission according to some embodiments of the present disclosure.
Figure 8:
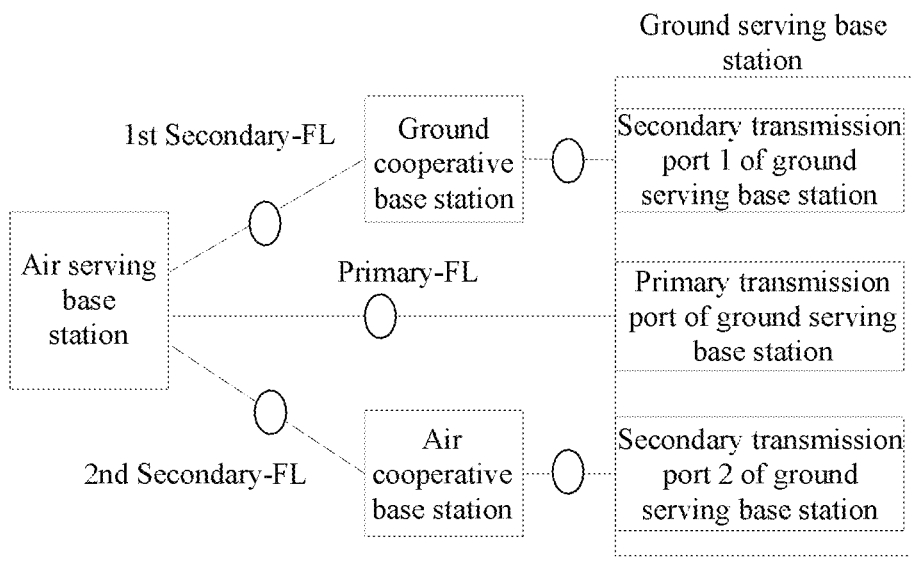
FIG. 8 is an architecture diagram of data and signaling transmission according to some embodiments of the present disclosure.

FIG. 7 is a schematic diagram of a link for data and signaling transmission according to some embodiments of the present disclosure. FIG. 8 is an architecture diagram of data and signaling transmission according to some embodiments of the present disclosure. As shown in FIG. 7 and FIG. 8, since the air serving base station in some embodiments may be a satellite base station, the link quality of the primary link changes depending on an orbit of a satellite. In other words, the link quality of the primary link would be the best if the satellite is moving to a perigee location, or to a location near to the ground serving base station. In such a case, after receiving the link information of the primary link sent by a satellite base station, the ground serving base station does not determine any cooperative base station and secondary link, and directly performs data or signaling transceiving with the air serving base station.

If the satellite moves to a position slightly further than the position near to the ground serving base station, the link quality of the primary link is reduced. Although in general the primary link can meet the requirements, in order to improve data or signaling transmission accuracy and prevent data or link transmission failures, after receiving the link quality of the air serving base station, the ground serving base station decides to establish a first secondary link, finds a ground base station relatively closer to the air serving base station as a ground cooperative base station, and sends necessary information for establishing a link to the air serving base station and the ground cooperative base station respectively.

In such a case, in order to save resources, the ground serving base station may adopt a switched transmission mode, and a secondary link with higher link quality may be selected for data or signaling transmission. In other words, the ground serving base station performs data or signaling transmission indirectly with the air serving base station via the ground cooperative base station through the first secondary link. Meanwhile, the transmission of data or signaling via the primary link is stopped. In order to improve the transmission accuracy and transmission efficiency, the ground serving base station may adopt a duplicated transmission mode, and data or signaling transmission may be performed in parallel via both the primary link and the secondary link. In other words, the ground serving base station indirectly performs data or signaling transmission with the air serving base station via the ground cooperative base station through the first secondary link, and the ground serving base station directly performs data or signaling transmission with the air serving base station through the primary link. The specific selection of data or signaling transmission modes may be correspondingly set according to practical requirements.

Further, if the satellite moves to an even further location, such as an apogee or a location far from a ground service location, the link quality of the primary link in such a case becomes so poor that it is difficult for the ground serving base station to complete transmission of data or signaling with the air serving base station through the primary link. Therefore, the ground serving base station decides to establish a second secondary link after receiving the link quality of the primary link from the air serving base station. According to the link quality of the primary link and the location information of each of the current air satellite base stations, the ground serving base station selects a relatively reliable satellite base station as a cooperative satellite base station, and respectively sends necessary information for establishing a link to the air serving base station and the ground cooperative base station.

In such a case, in order to save resources and prevent transmission failure, the ground serving base station may adopt a switched transmission mode, and a secondary link with higher link quality may be selected for data or signaling transmission. In other words, the ground serving base station performs data or signaling transmission indirectly with the air serving base station via the ground cooperative base station through the second secondary link. Meanwhile, the transmission of data or signaling via the primary link is stopped. In order to improve the transmission efficiency, the ground serving base station may adopt a duplicated transmission mode, and data or signaling transmission may be performed in parallel via both the primary link and the secondary link. In other words, the ground serving base station indirectly performs data or signaling transmission with the air serving base station via the ground cooperative base station through the first secondary link, and the ground serving base station directly performs data or signaling transmission with the air serving base station through the primary link. In order to improve the transmission efficiency when the switched transmission mode is adopted, one or more secondary links with the second highest link quality may also be selected, for example, the first secondary link may assist the second secondary link in transmission. The specific selection of data or signaling transmission modes may be correspondingly set according to practical requirements.

In consideration of that when the method is applied in a scenario of satellite, the orbit in which the satellite moves is constant, whether to establish a secondary link or not and the type and number of the secondary links to be established may be decided by the ground serving base station by acquiring distance information between the air serving base station and the ground serving base station.

In some exemplary implementations, the configuration information of a base station includes at least port information and address information of the base station.

In some exemplary implementations, in a case where the ground serving base station receives secondary link establishment failure information fed back by the air serving base station or the at least one cooperative base station, the method may further include the following operations. The ground serving base station determines at least one standby cooperative base station according to secondary link service quality information of the at least one cooperative base station. The ground serving base station sends, to the air serving base station and the at least one standby cooperative base station, indication information for establishing at least one secondary link.

As some exemplary implementations, a neighboring base station of the currently unsuccessfully established cooperative base station may be selected as a standby cooperative base station.

If a radio channel of the primary link has the characteristic of reciprocity (e.g., the radio channel of the Time Division Duplexing (TDD) system), the ground serving base station and the air serving base station may achieve data and signaling sending over the radio channel corresponding to data and signaling receiving. Meanwhile, the uplink and downlink radio channels may be coupled together. If the radio channel of the primary link does not have the characteristics of reciprocity (e.g., the radio channel of the Frequency Division Duplexing (FDD) system), the ground serving base station and the air serving base station may not achieve data and signaling sending over the radio channel corresponding to data and signaling receiving. In such a case, the uplink radio channel and the downlink radio information are separated. Similarly, this mechanism also applies for the first secondary link and the second secondary link.

As some exemplary implementations, both data and signaling transmitting parties may notify each other via explicit cells of RNL logical network application layer protocols (for example, NGAP, XnAP, and F1AP) or via user service control frames of the user plane (for example, GTP-U Control PDU).

Through the above operations, the technical problem in the related art that once the transmission of data and signaling over a feeder transmission link has an error or becomes inefficient, all the transmission performance associated with the subsequent service link becomes meaningless is solved, thereby improving the stability of the data and signaling transmission of the whole system, and enhancing the robustness and the data signaling transmission efficiency of the related interface connection of mobile network nodes.

Through the description of the above implementations, those having ordinary skill in the art can clearly understand that the method according to the above embodiments may be implemented by means of software plus a necessary general hardware platform, and of course, may also be implemented through hardware, but in many cases, the former is a better implementation manner. Based on such understanding, the technical solution of the present disclosure, which is essential or contributes to the conventional art, may be embodied in the form of a software product stored in a storage medium (such as a Read-Only Memory (ROM)/Random Access Memory (RAM), a magnetic disk and an optical disc), including a number of instructions for causing a terminal device (which may be a mobile phone, a computer, a server, or a network device, etc.) to perform the methods described in various embodiments of the present disclosure.

Figure 9:
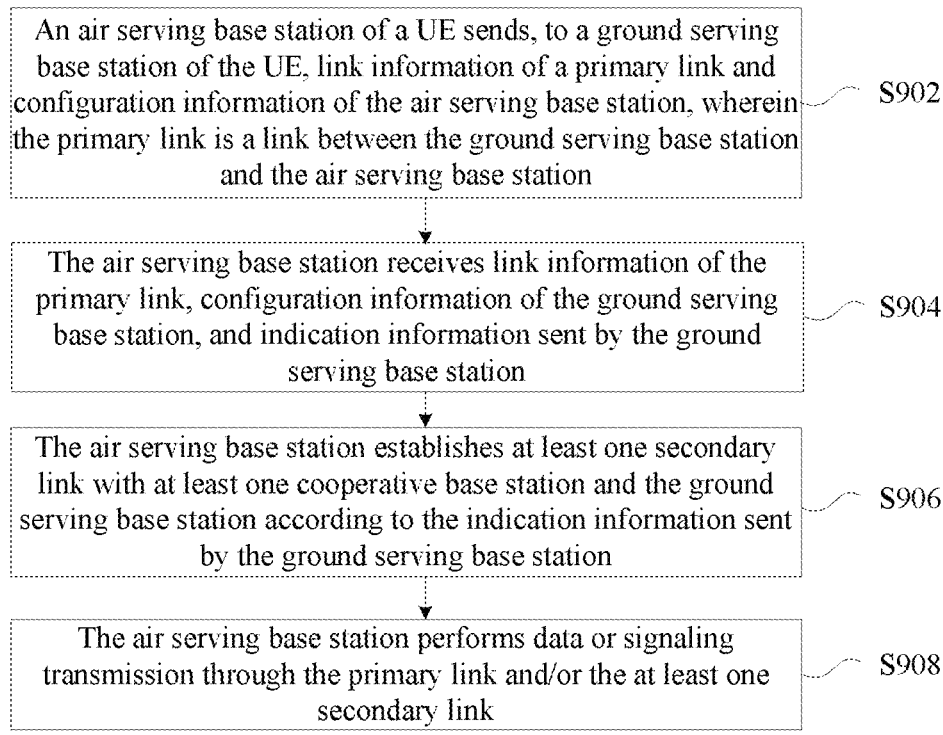
FIG. 9 is a flowchart of a link establishment method according to some embodiments of the present disclosure.

A link establishment method running on the above mobile terminal or network architecture is provided in some embodiments of the present disclosure. FIG. 9 is a flowchart of a link establishment method according to some embodiments of the present disclosure. As shown in FIG. 9, the flow includes the following operations.

In operation S902, an air serving base station of a UE sends, to a ground serving base station of the UE, link information of a primary link and configuration information of the air serving base station, wherein the primary link is a link between the ground serving base station and the air serving base station.

In operation S904, the air serving base station receives link information of the primary link, configuration information of the ground serving base station, and indication information sent by the ground serving base station.

In operation S906, the air serving base station establishes at least one secondary link with at least one cooperative base station and the ground serving base station according to the indication information sent by the ground serving base station.

In operation S908, the air serving base station performs data or signaling transmission through the primary link and/or the at least one secondary link.

In some exemplary implementations, the indication information includes at least configuration information of the at least one cooperative base station.

In some exemplary implementations, the operation that the air serving base station establishes the at least one secondary link with the at least one cooperative base station according to the indication information sent by the ground serving base station may be implemented in the following manner. The air serving base station sends, according to the configuration information of the at least one cooperative base station, a request for establishing the at least one secondary link to the at least one cooperative base station. After receiving a successful establishment response fed back by the at least one cooperative base station, the air serving base station establishes the at least one secondary link with the at least one cooperative base station.

In some exemplary implementations, the method may further include the following operation. After receiving a rejection response fed back by the at least one cooperative base station, the air serving base station sends a request for replacing the at least one cooperative base station to the ground serving base station.

In some exemplary implementations, the operation that the air serving base station establishes the at least one secondary link with the at least one cooperative base station and the ground serving base station according to the indication information sent by the ground serving base station may be implemented in the following manner. The air serving base station receives a request sent by the at least one cooperative base station for establishing the at least one secondary link. In a case of determining that the at least one cooperative base station meets a preset condition, the air serving base station feeds back a successful establishment response for establishing the at least one secondary link to the at least one cooperative base station, and establishes the at least one secondary link with the at least one cooperative base station.

In some exemplary implementations, the method may further include the following operation. in a case of determining that the at least one cooperative base station does not meet the preset condition, the air serving base station feeds back a rejection response to the at least one cooperative base station, and sends a request for replacing the at least one cooperative base station to the ground serving base station.

In some exemplary implementations, the preset condition may at least include quality information of information sent by the at least one cooperative base station and the distance between the at least one cooperative base station and the air serving base station.

In some exemplary implementations, the configuration information of a base station includes port information and address information of the base station.

In some exemplary implementations, the operation that the air serving base station establishes the at least one secondary link with the at least one cooperative base station according to the indication information sent by the ground serving base station may further include the following operations. The air serving base station determines feature information of the at least one cooperative base station according to the indication information. The air serving base station establishes the at least one secondary link with the at least one cooperative base station according to the feature information of the at least one cooperative base station.

In some exemplary implementations, the feature information of the at least one cooperative base station at least includes a type and the number of the at least one cooperative base station.

In some exemplary implementations, the method may further include the following operations. In a case where the type of the cooperative base station is a ground cooperative base station, the air serving base station establishes a first secondary link with the ground cooperative base station. In a case where the type of the cooperative base station is an air cooperative base station, the air serving base station establishes a second secondary link with the air cooperative base station. Link quality corresponding to a second quality threshold is independent of and different from link quality corresponding to a first quality threshold.

In some exemplary implementations, the operation that the air serving base station establishes the at least one secondary link with the at least one cooperative base station and the ground serving base station according to the indication information sent by the ground serving base station may further include the following operation. The air serving base station determines a data or signaling transmission mode according to the indication information.

In some exemplary implementations, the operation that the air serving base station performs data or signaling transmission through the primary link and/or the at least one secondary link includes the following operations. In a case where the data or signaling transmission mode is a duplicated transmission mode, the air serving base station simultaneously performs data or signaling transmission with the at least one cooperative base station on the primary link and the at least one secondary link. In a case where the data or signaling transmission mode is a switched transmission mode, the air serving base station selects a link with highest link quality from the primary link and the at least one secondary link for data or signaling transmission.

In some exemplary implementations, after the air serving base station sends the link information of the primary link to the ground serving base station, the method may further include the following operation. The air serving base station performs data or signaling transmission with the ground serving base station through the primary link according to transmission indication information sent by the ground serving base station.

Figure 10:
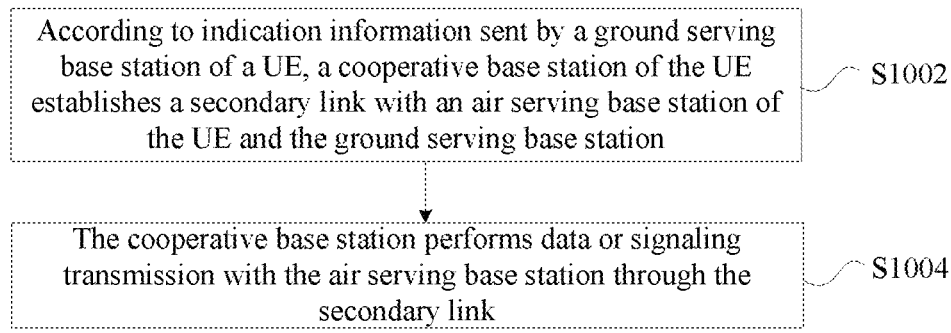
FIG. 10 is a flowchart of another link establishment method according to some embodiments of the present disclosure.

A link establishment method running on the above mobile terminal or network architecture is provided in some embodiments of the present disclosure. FIG. 10 is a flowchart of another link establishment method according to some embodiments of the present disclosure. As shown in FIG. 10, the flow includes the following operations.

In operation S1002, according to indication information sent by a ground serving base station of a UE, a cooperative base station of the UE establishes a secondary link with an air serving base station of the UE and the ground serving base station.

In operation S1004, the cooperative base station performs data or signaling transmission with the air serving base station through the secondary link.

In some exemplary implementations, the indication information at least includes configuration information of the air serving base station.

In some exemplary implementations, the operation that the cooperative base station establishes the secondary link with the air serving base station according to the indication information sent by the ground serving base station may be implemented in the following manner. The cooperative base station sends, according to the configuration information of the air serving base station, a request for establishing the secondary link to the air serving base station.

In some exemplary implementations, after receiving a successful establishment response fed back by the air serving base station, the cooperative base station establishes the secondary link with the air serving base station.

In some exemplary implementations, the operation that the cooperative base station establishes the secondary link with the air serving base station according to the indication information sent by the ground serving base station may be implemented in the following manner. The cooperative base station receives a request sent by the air serving base station for establishing the secondary link. In a case of determining that the air serving base station meets a preset condition, the cooperative base station feeds back a successful establishment response for establishing the secondary link to the air serving base station, and establishes the secondary link with the air serving base station.

In some exemplary implementations, the method may further include the following operation. In a case of determining that the air serving base station does not meet the preset condition, the cooperative base station feeds back a rejection response to the air serving base station, and instructs the air serving base station to send a request for replacing the cooperative base station to the ground serving base station.

In some exemplary implementations, the type of the cooperative base station includes one of the following: a ground cooperative base station and an air cooperative base station.

In some exemplary implementations, the method may further include the following operations. In a case where the cooperative base station is the ground cooperative base station, the ground cooperative base station establishes a first secondary link with the air serving base station. In a case where the cooperative base station is the air cooperative base station, the air cooperative base station establishes a second secondary link with the air serving base station. Link quality corresponding to a second quality threshold is independent of and different from link quality corresponding to a first quality threshold.

In some exemplary implementations, the operation that the cooperative base station performs data or signaling transmission with the air serving base station through the secondary link may be implemented in the following manner. The cooperative base station performs data or signaling transmission with the air serving base station according to a data or signaling transmission mode sent by the ground serving base station.

In some exemplary implementations, the method may further include the following operations. In a case where the data or signaling transmission mode is a duplicated transmission mode, the cooperative base station performs data or signaling transmission with the air serving base station. In a case where the data or signaling transmission mode is a switched transmission mode, the cooperative base station performs data or signaling transmission according to a link indication sent by the ground serving base station.

In some exemplary implementations, the operation that in a case where the data or signaling transmission mode is the switched transmission mode, the cooperative base station performs data or signaling transmission according to the link indication sent by the ground serving base station may be implemented in the following manner. In a case where, in all links that have been established, a primary link between the ground serving base station and the air serving base station has highest link quality, the cooperative base station receives an indication of canceling data or signaling transmission, and cancels data or signaling transmission. In a case where, in all links that have been established, the secondary link has the highest link quality, the cooperative base station receives an indication of performing data or signaling transmission and then performs data or signaling transmission.

In order to facilitate better understanding of the technical solutions described in the above embodiments, the following scenarios are provided for ease of understanding.

Scenario 1:

In a Low Earth Orbiting (LEO) low-orbit satellite mobile communication system, multiple LEO satellites orbit around the earth according to specific ephemeris information in a specific LEO orbit. These satellites all carry a complete gNB function and provide a satellite Non-Terrestrial Networks (NTN) radio access service for ground UEs. Multiple satellite ground station gateway (NTN-GW) entities are deployed on the ground, the functions of a 5GC are integrated in the entities, and therefore each LEO satellite needs to establish and maintain one or more feeder transmission links respectively with one or more NTN-GW/5GCs on the ground at appropriate occasions according to the current position of the satellite, wherein the one or more feeder links are used for bearing NG interface connection instances wirelessly. The NTN-GW may pre-configure common interface transmission port and address information of each target ground serving station to each LEO satellite in advance for establishing a non-UE associated common NG interface instance, namely: when a certain LEO satellite moves to a specific spatial physical location, the LEO satellite can actively trigger an NG interface public establishment flow (NG Setup) at an appropriate occasion so as to complete basic communication connection between a satellite base station and a ground station core network, and then serve a subsequent UE associated NG connection instance. Assuming that a certain UE is already in an RRC connected state (user service data is being transmitted), there is accordingly a UE associated NG-C control plane connection instance and an NG-U user plane connection instance.

Figure 11:
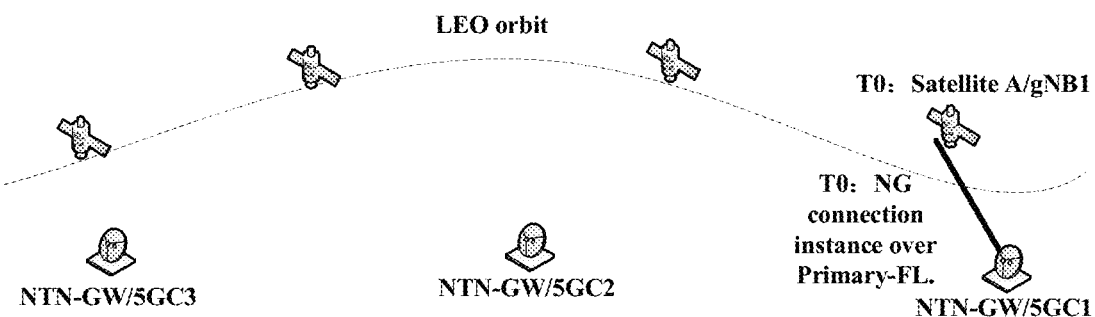
FIG. 11 is a schematic diagram 1 of transmission based on scenario 1 according to some embodiments of the present disclosure.

FIG. 11 is a schematic diagram 1 of transmission based on scenario 1 according to some embodiments of the present disclosure. As shown in FIG. 11, at time T0, an NG-C control plane connection instance and an NG-U user plane connection instance have been established and maintained between a current serving SatelliteA/gNB1 and a current ground serving station NTN-GW/5GC1 of a UE for uplink and downlink transmission of UE associated NGAP signaling and user service data packets, respectively. Since SatelliteA/gNB1 and NTN-GW/5GC1 are physically close to each other in the present case, a Primary-FL transmission link has a good quality, and no additional secondary Feeder Transmission link needs to be established for assisting the transmission.

Figure 12:
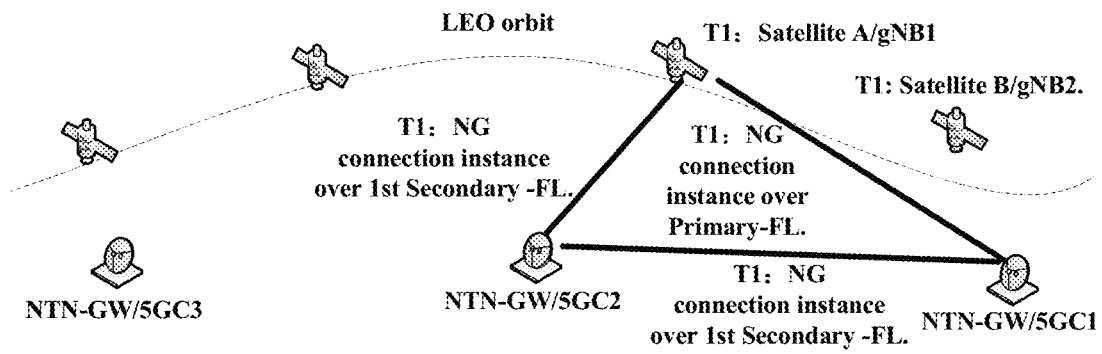
FIG. 12 is a schematic diagram 2 of transmission based on scenario 1 according to some embodiments of the present disclosure.

FIG. 12 is a schematic diagram 2 of transmission based on scenario 1 according to some embodiments of the present disclosure. As shown in FIG. 12, at time T1, the current serving SatelliteA/gNB1 of the UE moves to a spatial location slightly further from the current ground serving station NTN-GW/5GC1. In such a case, the transmission link quality of Primary-FL becomes slightly worse. SatelliteA/gNB1 informs, through NGAP messages, NTN-GW/5GC1 of the latest status of each Feeder transmission link currently configured and receiving end 1st Secondary-FL port and address information pre-allocated at SatelliteA/gNB1. NTN-GW/5GC1 then decides to set up 1st Secondary-FL for assisting the transmission, and adopts a duplicated transmission mode. Therefore, NTN-GW/5GC1 notifies, via the NGAP message, SatelliteA/gNB1 of port and address information pre-allocated for a ground cooperative serving station NTN-GW/5GC2 serving as a receiving end, and a duplicated transmission mode indicator, e.g., NG Duplication Indicator {Primary-FL, 1st Secondary-FL}.

After time T1, based on the receiving end port and address information of the ground cooperative serving station NTN-GW/5GC2 provided by NTN-GW/5GC1, SatelliteA/gNB1 actively triggers an attempt to establish 1st secondary-FL. In a reverse direction, the ground cooperative serving station NTN-GW/5GC2 also attempts to establish 1st Secondary-FL based on the receiving end port and address information provided by SatelliteA/gNB1. As Space-FL between Satellite A/gNB1 and the ground cooperative serving station NTN-GW/5GC2 and Earth-FL between NTN-GW/5GC1 and NTN-GW/5GC2 are successfully established, 1st Secondary-FL may be used to assist Primary-FL in data and signaling transmission. Thereafter, a sending end node always transmits the same backup NG data and signaling through Primary-FL and 1st Secondary-FL, respectively.

Figure 13:
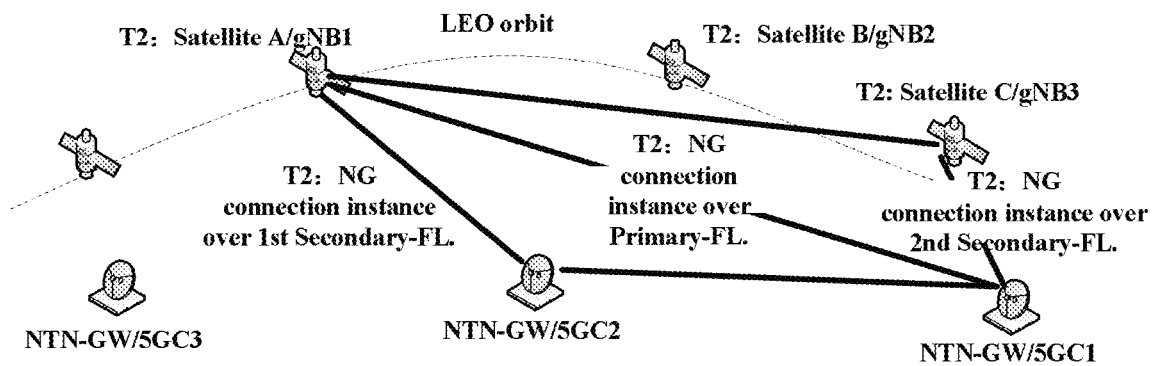
FIG. 13 is a schematic diagram 3 of transmission based on scenario 1 according to some embodiments of the present disclosure.

FIG. 13 is a schematic diagram 3 of transmission based on scenario 1 according to some embodiments of the present disclosure. As shown in FIG. 13, at time T2, the current serving SatelliteA/gNB1 of the UE moves to a spatial location further from the current ground serving station NTN-GW/5GC1. In such a case, the transmission link quality of Primary-FL becomes worse (assuming it is not reliable enough for transmission of data and signaling). SatelliteA/gNB1 informs, through NGAP messages, NTN-GW/5GC1 of the latest status of each transmission link currently configured and receiving end 2nd Secondary-FL port and address information pre-allocated to SatelliteA/gNB1. NTN-GW/5GC1 then decides to set up 2nd Secondary-FL for assisting the transmission, and adopts a duplicated transmission mode. Therefore, NTN-GW/5GC1 notifies, via the NGAP message, SatelliteA/gNB1 of port and address information of a ground cooperative serving station SatelliteC/gNB3 serving as a receiving end, and a duplicated transmission mode indicator, e.g., NG Duplication Indicator {1st Secondary-FL, 2nd Secondary-FL}, no longer containing Primary-FL.

After time T2, based on the port and address information of the ground cooperative serving station SatelliteC/gNB3 serving as the receiving end provided by NTN-GW/5GC1, SatelliteA/gNB1 actively triggers an attempt to establish 2nd Secondary-FL. In a reverse direction, the ground cooperative serving station SatelliteC/gNB3 also attempts to establish 2nd Secondary-FL based on the receiving end port and address information provided by SatelliteA/gNB1. As Space-FL between NTN-GW/5GC1 and the ground cooperative serving station SatelliteC/gNB3 and Space-FL between SatelliteA/gNB1 and SatelliteC/gNB3 are successfully established, 2nd Secondary-FL may be also used to assist Primary-FL in data and signaling transmission. Thereafter, a sending end node always transmits the same backup NG data and signaling through 1st Secondary-FL and 2nd Secondary-FL, respectively.

Scenario 2:

In an LEO low-orbit satellite mobile communication system, multiple LEO satellites orbit around the earth according to specific ephemeris information in a specific LEO orbit. These satellites all carry a complete gNB function and provide a satellite NTN radio access service for ground UEs. Multiple satellite ground station gateway NTN-GW entities are deployed on the ground, the functions of a 5GC are integrated in the entities, and therefore each LEO satellite needs to establish and maintain one or more feeder transmission links respectively with one or more NTN-GW/5GCs on the ground at appropriate occasions according to the current position of the satellite, wherein the one or more feeder links are used for bearing NG interface connection instances wirelessly. The NTN-GW may pre-configure common interface transmission port and address information of each target ground serving station to each LEO satellite in advance for establishing a non-UE associated common NG interface instance, namely: when a certain LEO satellite moves to a specific spatial physical location, the LEO satellite can actively trigger an NG interface public establishment flow (NG Setup) at an appropriate occasion so as to complete basic communication connection between a satellite base station and a ground station core network, and then serve a subsequent UE associated NG connection instance. Assuming that a certain UE is already in an RRC connected state (user service data is being transmitted), there is accordingly a UE associated NG-C control plane connection instance and an NG-U user plane connection instance.

Figure 14:
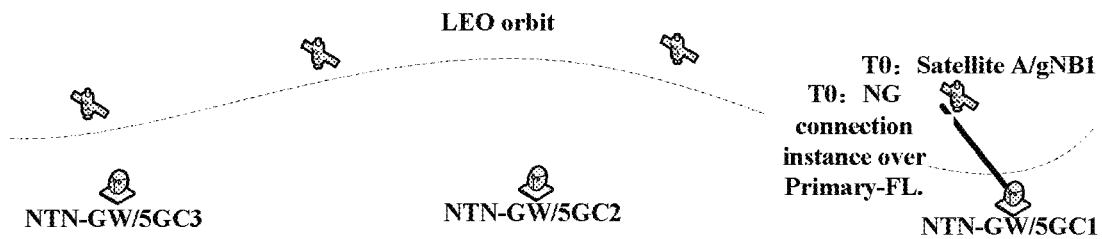
FIG. 14 is a schematic diagram 1 of transmission based on scenario 2 according to some embodiments of the present disclosure.

FIG. 14 is a schematic diagram 1 of transmission based on scenario 2 according to some embodiments of the present disclosure. As shown in FIG. 14, at time T0, an NG-C control plane connection instance and an NG-U user plane connection instance have been established and maintained between a current serving SatelliteA/gNB1 and a current ground serving station NTN-GW/5GC1 of a UE for uplink and downlink transmission of UE associated NGAP signaling and user service data packets, respectively. Since SatelliteA/gNB1 and NTN-GW/5GC1 are physically close to each other in the present case, a Primary-FL transmission link has a good quality, and no additional secondary Feeder Transmission link needs to be established for assisting the transmission.

Figure 15:
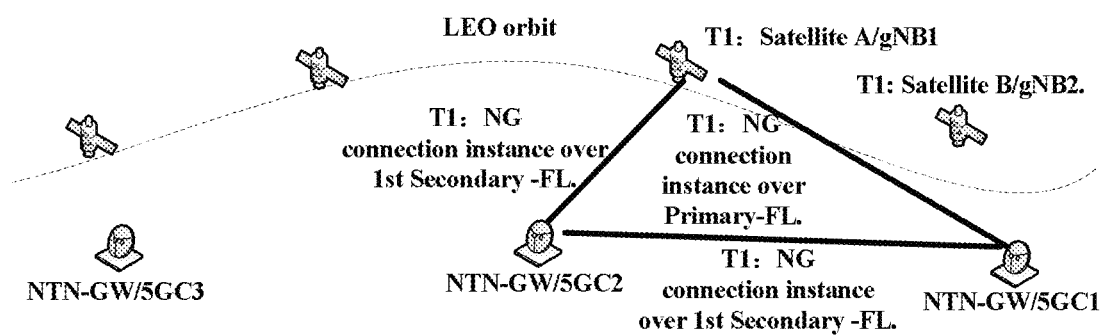
FIG. 15 is a schematic diagram 2 of transmission based on scenario 2 according to some embodiments of the present disclosure.

FIG. 15 is a schematic diagram 2 of transmission based on scenario 2 according to some embodiments of the present disclosure. As shown in FIG. 15, at time T1, the current serving SatelliteA/gNB1 of the UE moves to a spatial location slightly further from the current ground serving station NTN-GW/5GC1. In such a case, the transmission link quality of Primary-FL becomes slightly worse. SatelliteA/gNB1 informs, through NGAP messages, NTN-GW/5GC1 of the latest status of each Feeder transmission link currently configured and receiving end 1st Secondary-FL port and address information pre-allocated at SatelliteA/gNB1. NTN-GW/5GC1 then decides to set up 1st Secondary-FL for assisting the transmission, and adopts a switched transmission mode. Therefore, NTN-GW/5GC1 notifies, via the NGAP message, SatelliteA/gNB1 of port and address information pre-allocated for a ground cooperative serving station NTN-GW/5GC2 serving as a receiving end, and the switched transmission mode indicates NG Switch Indicator {Primary-FL->1st Secondary-FL}.

After time T1, based on the receiving end port and address information of the ground cooperative serving station NTN-GW/5GC2 provided by NTN-GW/5GC1, SatelliteA/gNB1 actively triggers an attempt to establish 1st secondary-FL. In a reverse direction, the ground cooperative serving station NTN-GW/5GC2 also attempts to establish 1st Secondary-FL based on the receiving end port and address information provided by SatelliteA/gNB1. As Space-FL between Satellite A/gNB1 and the ground cooperative serving station NTN-GW/5GC2 and Earth-FL between NTN-GW/5GC1 and NTN-GW/5GC2 are successfully established, 1st Secondary-FL may be used to assist Primary-FL in data and signaling transmission. Thereafter, a sending end node only transmits NG data and signaling through 1st Secondary-FL.

Figure 16:
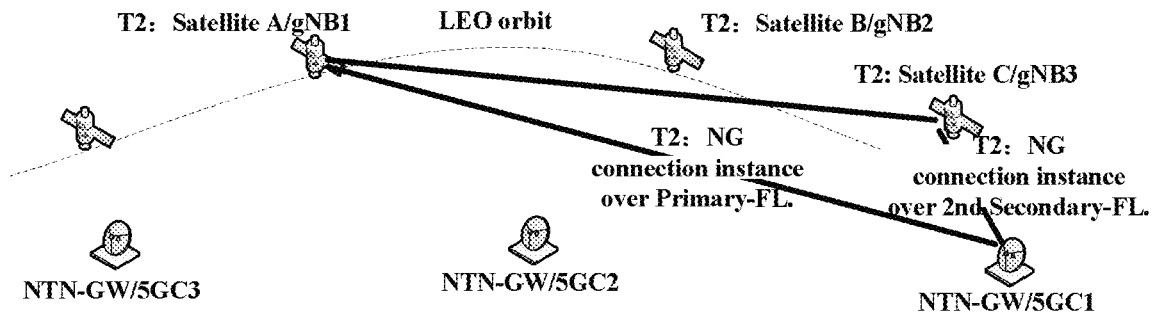
FIG. 16 is a schematic diagram 3 of transmission based on scenario 2 according to some embodiments of the present disclosure.

FIG. 16 is a schematic diagram 3 of transmission based on scenario 2 according to some embodiments of the present disclosure. As shown in FIG. 16, at time T2, the current serving SatelliteA/gNB1 of the UE moves to a spatial location further from the current ground serving station NTN-GW/5GC1. In such a case, the Primary-FL and Secondary-FL transmission link quality becomes worse (assuming it is not reliable enough for transmission of data and signaling). SatelliteA/gNB1 informs, through NGAP messages, NTN-GW/5GC1 of the latest status of each transmission link currently configured and receiving end 2nd Secondary-FL port and address information pre-allocated to SatelliteA/gNB1. NTN-GW/5GC1 then decides to set up 2nd Secondary-FL for assisting the transmission, and adopts a switched transmission mode. Therefore, NTN-GW/5GC1 notifies, via the NGAP message, SatelliteA/gNB1 of port and address information pre-allocated for a ground cooperative serving station SatelliteC/gNB3 serving as a receiving end, and the switched transmission mode indicates NG Switch Indicator {1st Secondary-FL->2nd Secondary-FL}. In addition, NTN-GW/5 GC 1 also decides to tear down the 1st Secondary-FL transmission link.

After time T2, based on the port and address information of the ground cooperative serving station SatelliteC/gNB3 serving as the receiving end provided by NTN-GW/5GC1, SatelliteA/gNB1 actively triggers an attempt to establish 2nd Secondary-FL. In a reverse direction, the ground cooperative serving station SatelliteC/gNB3 also attempts to establish 2nd Secondary-FL based on the receiving end port and address information provided by SatelliteA/gNB1. As Space-FL between NTN-GW/5GC1 and the ground cooperative serving station SatelliteC/gNB3 and Space-FL between SatelliteA/gNB1 and SatelliteC/gNB3 are successfully established, 2nd Secondary-FL may be also used to assist Primary-FL in data and signaling transmission. Thereafter, a sending end node only transmits NG data and signaling through 2nd Secondary-FL.

Scenario 3:

In an LEO low-orbit satellite mobile communication system, multiple LEO satellites orbit around the earth according to specific ephemeris information in a specific LEO orbit. These satellites all carry a partial gNB/gNB-DU function and provide a satellite NTN radio access service for ground UEs. Multiple satellite ground station gateway NTN-GW entities are deployed on the ground, the functions of a gNB-CU are integrated in the entities, and therefore each LEO satellite needs to establish and maintain one or more feeder transmission links respectively with one or more NTN-GW/5GCs on the ground at appropriate occasions according to the current position of the satellite, wherein the one or more feeder links are used for bearing NG interface connection instances wirelessly. The NTN-GW may preconfigure common interface transmission port and address information of each target ground serving station to each LEO satellite in advance for establishing a non-UE associated common F1 interface instance, namely: when a certain LEO satellite moves to a specific spatial physical location, the LEO satellite can actively trigger an F1 interface public establishment flow (F1 Setup) at an appropriate occasion so as to complete basic communication connection between a satellite base station and a ground station gNB-CU, and then serve a subsequent special UE associated F1 connection instance. Assuming that a certain UE is already in an RRC connected state (user service data is being transmitted), there is accordingly a UE associated F1-C control plane connection instance and an F1-U user plane connection instance.

Figure 17:
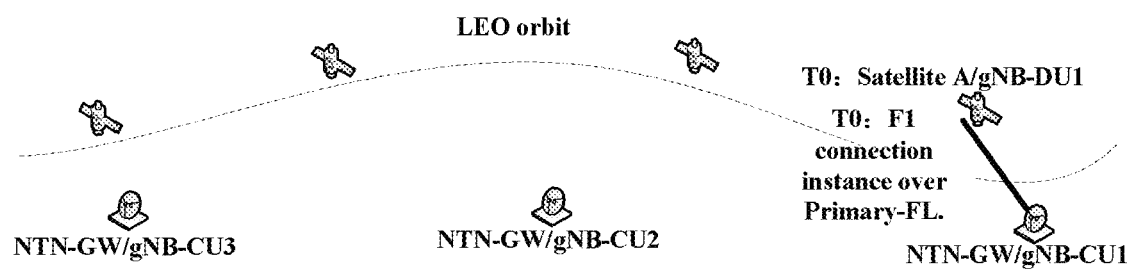
FIG. 17 is a schematic diagram 1 of transmission based on scenario 3 according to some embodiments of the present disclosure.

FIG. 17 is a schematic diagram 1 of transmission based on scenario 3 according to some embodiments of the present disclosure. As shown in FIG. 17, at time T0, an F1-C control plane connection instance and an F1-U user plane connection instance have been established and maintained between a current serving SatelliteA/gNB-DU1 and a current ground serving station NTN-GW/gNB-CU1 of a UE for uplink and downlink transmission of UE associated F1AP signaling and user service data packets, respectively. Since SatelliteA/gNB-DU1 and NTN-GW/gNB-CU1 are physically close to each other in the present case, a Primary-FL transmission link has a good quality, and no additional secondary Feeder Transmission link needs to be established for assisting the transmission.

Figure 18:
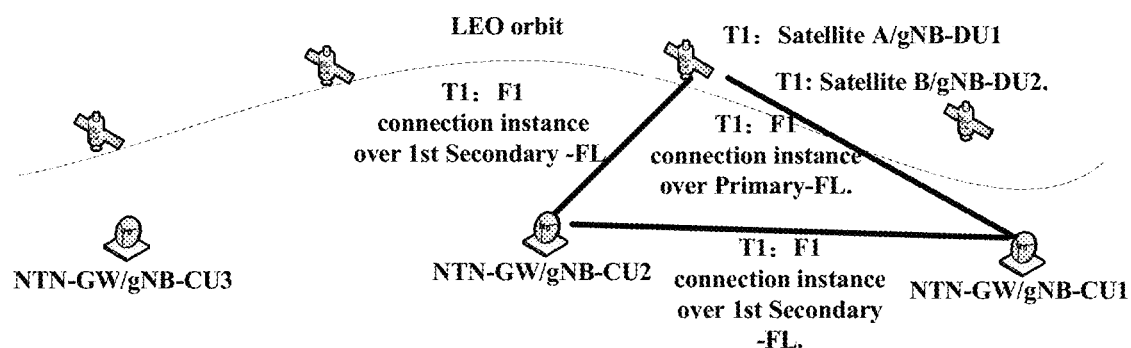
FIG. 18 is a schematic diagram 2 of transmission based on scenario 3 according to some embodiments of the present disclosure.

FIG. 18 is a schematic diagram 2 of transmission based on scenario 3 according to some embodiments of the present disclosure. As shown in FIG. 18, at time T1, the current serving SatelliteA/gNB-DU1 of the UE moves to a spatial location slightly further from the current ground serving station NTN-GW/gNB-CU1. In such a case, the transmission link quality of Primary-FL becomes slightly worse. SatelliteA/gNB-DU1 informs, through F1AP messages, NTN-GW/gNB-CU1 of the latest status of each Feeder transmission link currently configured and receiving end 1st Secondary-FL port and address information pre-allocated at SatelliteA/gNB-DU1. NTN-GW/gNB-CU1 then decides to set up 1st Secondary-FL for assisting the transmission, and adopts a duplicated transmission mode. Therefore, SatelliteA/gNB-DU1 is notified, by the F1AP message, of port and address information pre-allocated for a ground cooperative serving station NTN-GW/gNB-CU2 serving as a receiving end, and a duplicated transmission mode indicator, e.g., F1 Duplication Indicator {Primary-FL, 1st Secondary-FL}.

After time T1, based on the port and address information of the ground cooperative serving station NTN-GW/gNB-CU2 serving as the receiving end provided by NTN-GW/gNB-CU1, SatelliteA/gNB-DU1 actively triggers an attempt to establish 1st Secondary-FL. In a reverse direction, the ground cooperative serving station NTN-GW/gNB-CU2 also attempts to establish 1st Secondary-FL based on the receiving end port and address information provided by SatelliteA/gNB-DU1. As Space-FL between SatelliteA/gNB-DU1 and the ground cooperative serving station NTN-GW/gNB-CU2 and Earth-FL between NTN-GW/gNB-CU1 and NTN-GW/gNB-CU2 are successfully established, 1st Secondary-FL may be used to assist Primary-FL in data and signaling transmission. Thereafter, a sending end node always transmits the same backup F1 data and signaling through Primary-FL and 1st Secondary-FL, respectively.

Figure 19:
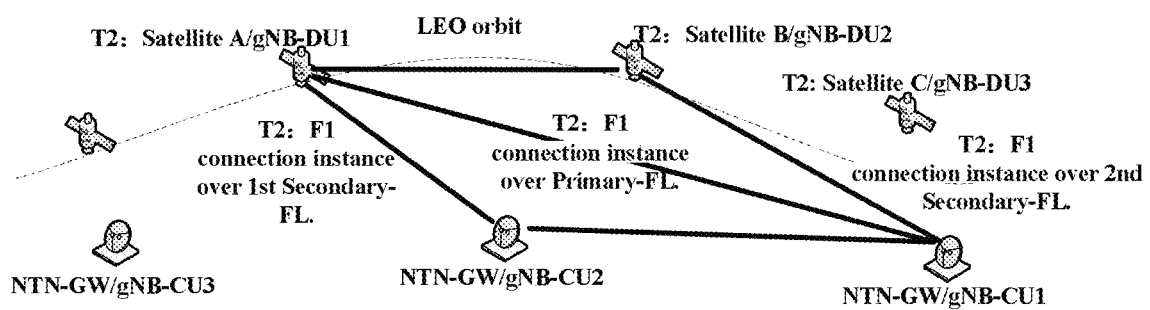
FIG. 19 is a schematic diagram 3 of transmission based on scenario 3 according to some embodiments of the present disclosure.

FIG. 19 is a schematic diagram 3 of transmission based on scenario 3 according to some embodiments of the present disclosure. As shown in FIG. 19, at time T2, the current serving SatelliteA/gNB-DU1 of the UE moves to a spatial location further from the current ground serving station NTN-GW/gNB-CU1. In such a case, the transmission link quality of Primary-FL becomes worse (assuming it is not reliable enough for transmission of data and signaling). SatelliteA/gNB-DU1 informs, through F1AP messages, NTN-GW/gNB-CU1 of the latest status of each transmission link currently configured and receiving end 2nd Secondary-FL port and address information pre-allocated to SatelliteA/gNB-DU1. NTN-GW/gNB-CU1 then decides to set up 2nd Secondary-FL for assisting the transmission, and adopts a duplicated transmission mode. Therefore, SatelliteA/gNB-DU1 is notified, by the F1AP message, of port and address information of a ground cooperative serving station SatelliteB/gNB-DU2 serving as a receiving end, and a duplicated transmission mode indicator, e.g., F1 Duplication Indicator {1st Secondary-FL, 2nd Secondary-FL}, no longer containing Primary-FL.

After time T2, based on the port and address information of the ground cooperative serving station SatelliteB/gNB-DU2 serving as the receiving end provided by NTN-GW/gNB-CU1, SatelliteA/gNB-DU1 actively triggers an attempt to establish 2nd Secondary-FL. In a reverse direction, the ground cooperative serving station SatelliteB/gNB-DU2 also attempts to establish 2nd Secondary-FL based on the receiving end port and address information provided by SatelliteA/gNB-DU1. As Space-FL between NTN-GW/gNB-CU1 and the ground cooperative serving station SatelliteB/gNB-DU2 and Space-FL between SatelliteA/gNB-DU1 and SatelliteB/gNB-DU2 are successfully established, 2nd Secondary-FL may be also used to assist Primary-FL in data and signaling transmission. Thereafter, a sending end node always transmits the same backup F1 data and signaling through 1st Secondary-FL and 2nd Secondary-FL, respectively.

Scenario 4:

In an LEO low-orbit satellite mobile communication system, multiple LEO satellites orbit around the earth according to specific ephemeris information in a specific LEO orbit. These satellites all carry a partial gNB/gNB-DU function and provide a satellite NTN radio access service for ground UEs. Multiple satellite ground station gateway NTN-GW entities are deployed on the ground, the functions of a gNB-CU are integrated in the entities, and therefore each LEO satellite needs to establish and maintain one or more feeder transmission links respectively with one or more NTN-GW/5GCs on the ground at appropriate occasions according to the current position of the satellite, wherein the one or more feeder links are used for bearing NG interface connection instances wirelessly. The NTN-GW may pre-configure common interface transmission port and address information of each target ground serving station to each LEO satellite in advance for establishing a non-UE associated common F1 interface instance, namely: when a certain LEO satellite moves to a specific spatial physical location, the LEO satellite can actively trigger an F1 interface public establishment flow (F1 Setup) at an appropriate occasion so as to complete basic communication connection between a satellite base station and a ground station gNB-CU, and then serve a subsequent special UE associated F1 connection instance. Assuming that a certain UE is already in an RRC connected state (user service data is being transmitted), there is accordingly a UE associated F1-C control plane connection instance and an F1-U user plane connection instance.

Figure 20:
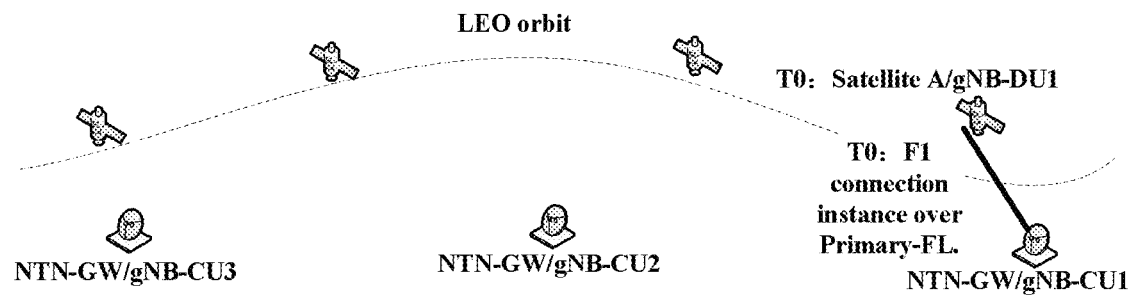
FIG. 20 is a schematic diagram 1 of transmission based on scenario 4 according to some embodiments of the present disclosure.

FIG. 20 is a schematic diagram 1 of transmission based on scenario 4 according to some embodiments of the present disclosure. As shown in FIG. 20, at time T0, an F1-C control plane connection instance and an F1-U user plane connection instance have been established and maintained between a current serving SatelliteA/gNB-DU1 and a current ground serving station NTN-GW/gNB-CU1 of a UE for uplink and downlink transmission of UE associated F1AP signaling and user service data packets, respectively. Since SatelliteA/gNB-DU1 and NTN-GW/gNB-CU1 are physically close to each other in the present case, a Primary-FL transmission link has a good quality, and no additional secondary Feeder Transmission link needs to be established for assisting the transmission.

Figure 21:
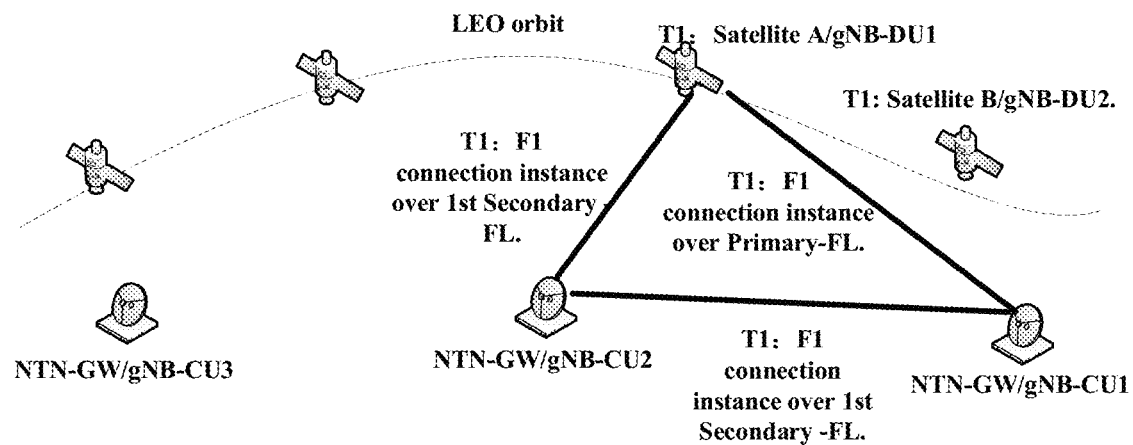
FIG. 21 is a schematic diagram 2 of transmission based on scenario 4 according to some embodiments of the present disclosure.

FIG. 21 is a schematic diagram 2 of transmission based on scenario 4 according to some embodiments of the present disclosure. As shown in FIG. 21, at time T1, the current serving SatelliteA/gNB-DU1 of the UE moves to a spatial location slightly further from the current ground serving station NTN-GW/gNB-CU1. In such a case, the transmission link quality of Primary-FL becomes slightly worse. SatelliteA/gNB-DU1 informs, through F1AP messages, NTN-GW/gNB-CU1 of the latest status of each Feeder transmission link currently configured and receiving end 1st Secondary-FL port and address information pre-allocated at SatelliteA/gNB-DU1. NTN-GW/gNB-CU1 then decides to set up 1st Secondary-FL for assisting the transmission, and adopts a switched transmission mode. Therefore, SatelliteA/gNB-DU1 is notified, by the F1AP message, of port and address information pre-allocated for a ground cooperative serving station NTN-GW/gNB-CU2 serving as a receiving end, and the switched transmission mode indicates F1 Switch Indicator {Primary-FL->1st Secondary-FL}.

After time T1, based on the port and address information of the ground cooperative serving station NTN-GW/gNB-CU2 serving as the receiving end provided by NTN-GW/gNB-CU1, SatelliteA/gNB-DU1 actively triggers an attempt to establish 1st Secondary-FL. In a reverse direction, the ground cooperative serving station NTN-GW/gNB-CU2 also attempts to establish 1st Secondary-FL based on the receiving end port and address information provided by SatelliteA/gNB-DU1. As Space-FL between SatelliteA/gNB-DU1 and the ground cooperative serving station NTN-GW/gNB-CU2 and Earth-FL between NTN-GW/gNB-CU1 and NTN-GW/gNB-CU2 are successfully established, 1st Secondary-FL may be used to assist Primary-FL in data and signaling transmission. Thereafter, a sending end node only transmits F1 data and signaling through 1st Secondary-FL.

Figure 22:
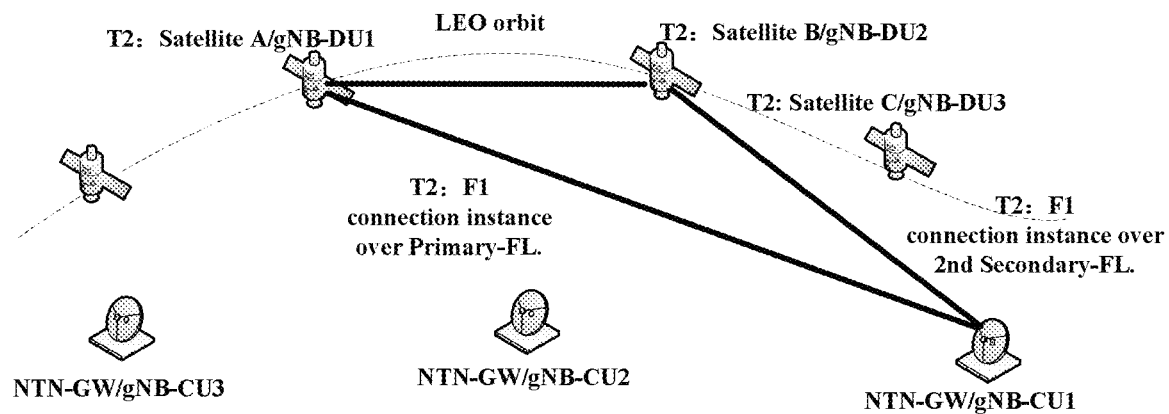
FIG. 22 is a schematic diagram 3 of transmission based on scenario 4 according to some embodiments of the present disclosure.

FIG. 22 is a schematic diagram 3 of transmission based on scenario 4 according to some embodiments of the present disclosure. As shown in FIG. 22, at time T2, the current serving SatelliteA/gNB-DU1 of the UE moves to a spatial location further from the current ground serving station NTN-GW/gNB-CU1. In such a case, the Primary-FL and 1st Secondary-FL transmission link quality becomes worse (assuming it is not reliable enough for transmission of data and signaling). SatelliteA/gNB-DU1 informs, through F1AP messages, NTN-GW/gNB-CU1 of the latest status of each transmission link currently configured and receiving end 2nd Secondary-FL port and address information pre-allocated to SatelliteA/gNB-DU1. NTN-GW/gNB-CU1 then decides to set up 2nd Secondary-FL for assisting the transmission, and adopts a switched transmission mode. Therefore, SatelliteA/gNB-DU1 is notified, by the NGAP message, of port and address information pre-allocated for a ground cooperative serving station SatelliteB/gNB-DU2 serving as a receiving end, and the switched transmission mode indicates F1 Switch Indicator {1st Secondary-FL->2nd Secondary-FL}. In addition, NTN-GW/gNB-CU1 also decides to tear down the 1st Secondary-FL transmission link.

After time T2, based on the port and address information of the ground cooperative serving station SatelliteB/gNB-DU2 serving as the receiving end provided by NTN-GW/gNB-CU1, SatelliteA/gNB-DU1 actively triggers an attempt to establish 2nd Secondary-FL. In a reverse direction, the ground cooperative serving station SatelliteB/gNB-DU2 also attempts to establish 2nd Secondary-FL based on the receiving end port and address information provided by SatelliteA/gNB-DU1. As Space-FL between NTN-GW/gNB-CU1 and the ground cooperative serving station SatelliteB/gNB-DU2 and Space-FL between SatelliteA/gNB-DU1 and SatelliteB/gNB-DU2 are successfully established, 2nd Secondary-FL may be also used to assist Primary-FL in data and signaling transmission. Thereafter, a sending end node only transmits F1 data and signaling through 2nd Secondary-FL.

In some embodiments, a link determination apparatus is also provided. The apparatus is used to implement the above embodiments and exemplary implementations, and those have not been described will not be elaborated. As used below, the term "module" may implement a combination of software and/or hardware of a predetermined function. Although the apparatus described in the following embodiments is preferably implemented in software, hardware, or a combination of software and hardware, is also possible and contemplated.

Figure 23:
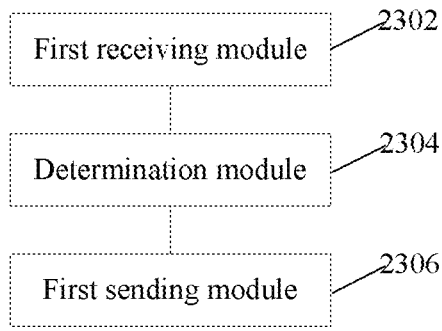
FIG. 23 is a structural block diagram of a link determination apparatus according to some embodiments of the present disclosure.

FIG. 23 is a structural block diagram of a link determination apparatus according to some embodiments of the present disclosure. The apparatus is located in a ground serving base station of a UE. As shown in FIG. 23, the apparatus includes: a receiving module 2302, a determination module 2304 and a first sending module 2306.

The first receiving module 2302 is configured to receive, from an air serving base station of the UE, link information of a primary link and configuration information of the air serving base station, wherein the primary link is a link between the ground serving base station and the air serving base station.

The determination module 2304 is configured to determine at least one cooperative base station of the UE and feature information of at least one secondary link according to the link information and the configuration information of the air serving base station, wherein the secondary link is a link among the air serving base station, the cooperative base station and the ground serving base station.

The first sending module 2306 is configured to send, to the air serving base station and the cooperative base station, indication information for establishing the at least one secondary link, the link information of the primary link, and configuration information of the ground serving base station.

Each of the above modules may be implemented by software or hardware. For the latter, it may be implemented by, but not limited to, the following manners that the above modules are all located in the same processor; or, the above modules are located in different processors in any combination form respectively.

In some embodiments, a link establishment apparatus is also provided. The apparatus is used to implement the above embodiments and exemplary implementations, and located in an air serving base station of a UE, and those have not been described will not be elaborated.

Figure 24:
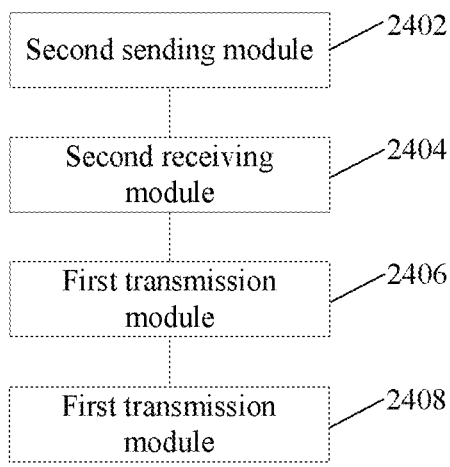
FIG. 24 is a structural block diagram of a link establishment apparatus according to some embodiments of the present disclosure.

FIG. 24 is a structural block diagram of a link establishment apparatus according to some embodiments of the present disclosure. The apparatus is located in an air serving base station of a UE. As shown in FIG. 24, the apparatus includes: a second sending module 2402, a second receiving module 2404, a first establishment module 2406 and a first transmission module 2408.

The second sending module 2402 is configured to send, to a ground serving base station of the UE, link information of a primary link and configuration information of the air serving base station, wherein the primary link is a link between the ground serving base station and the air serving base station.

The second receiving module 2404 is configured to receive link information of the primary link, configuration information of the ground serving base station, and indication information sent by the ground serving base station.

The first establishment module 2406 is configured to establish, according to the indication information sent by the ground serving base station, at least one secondary link with at least one cooperative base station and the ground serving base station.

The first transmission module 2408 is configured to perform data or signaling transmission through the primary link and/or the at least one secondary link.

Each of the above modules may be implemented by software or hardware. For the latter, it may be implemented by, but not limited to, the following manners that the above modules are all located in the same processor; or, the above modules are located in different processors in any combination form respectively.

In some embodiments, another link establishment apparatus is also provided. The apparatus is used to implement the above embodiments and exemplary implementations, and located in a cooperative base station of a UE, and those have not been described will not be elaborated.

Figure 25:
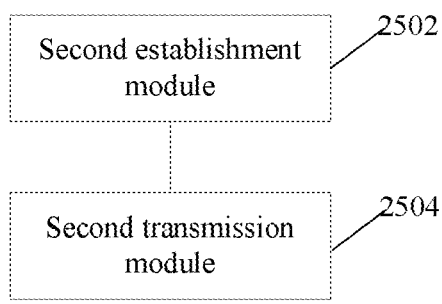
FIG. 25 is a structural block diagram of another link establishment apparatus according to some embodiments of the present disclosure.

FIG. 25 is a structural block diagram of another link establishment apparatus according to some embodiments of the present disclosure. The apparatus is located in a cooperative base station of a UE. As shown in FIG. 25, the apparatus includes: a second establishment module 2502 and a second transmission module 2504.

The second establishment module 2502 is configured to establish, according to indication information sent by a ground serving base station of the UE, a secondary link with an air serving base station of the UE and the ground serving base station.

The second transmission module 2504 is configured to perform data or signaling transmission with the air serving base station through the secondary link.

Each of the above modules may be implemented by software or hardware. For the latter, it may be implemented by, but not limited to, the following manners that the above modules are all located in the same processor; or, the above modules are located in different processors in any combination form respectively.

The embodiments of the present disclosure also provide a storage medium. The storage medium stores a computer program that performs the operations in any one of the above method embodiments at runtime.

In some embodiments, the storage medium may be configured to store a computer program for performing the following operations.

In S1, a ground serving base station of a UE receives, from an air serving base station of the UE, link information of a primary link and configuration information of the air serving base station, wherein the primary link is a link between the ground serving base station and the air serving base station.

In S2, the ground serving base station determines at least one cooperative base station of the UE and feature information of at least one secondary link according to the link information and the configuration information of the air serving base station, wherein the secondary link is a link among the air serving base station, the cooperative base station and the ground serving base station.

In S3, the ground serving base station sends, to the air serving base station and the cooperative base station, indication information for establishing the at least one secondary link, the link information of the primary link, and configuration information of the ground serving base station.

Or,

In S1, an air serving base station of a UE sends, to a ground serving base station of the UE, link information of a primary link and configuration information of the air serving base station, wherein the primary link is a link between the ground serving base station and the air serving base station.

In S2, the air serving base station receives link information of the primary link, configuration information of the ground serving base station, and indication information sent by the ground serving base station.

In S3, the air serving base station establishes at least one secondary link with at least one cooperative base station and the ground serving base station according to the indication information sent by the ground serving base station.

In S4, the air serving base station performs data or signaling transmission through the primary link and/or the at least one secondary link.

Or,

In S1, according to indication information sent by a ground serving base station of a UE, a cooperative base station of the UE establishes a secondary link with an air serving base station of the UE and the ground serving base station.

In S2, the cooperative base station performs data or signaling transmission with the air serving base station through the secondary link.

In some exemplary implementations, the storage medium may include, but is not limited to, various media capable of storing a computer program such as a U disk, a ROM, a RAM, a mobile hard disk, a magnetic disk or an optical disc.

The embodiments of the present disclosure also provide an electronic device. The electronic device includes a memory and a processor. The memory stores a computer program. The processor is configured to run the computer program to perform the operations in any one of the above method embodiments.

In some exemplary implementations, the electronic device may further include a transmission device and an input-output device. The transmission device is connected to the processor, and the input-output device is connected to the processor.

In some embodiments, the processor may be configured to use the computer program to perform the above similar operations.

Some examples of the embodiments may refer to the examples described in the above embodiments and alternative implementations, and details are not described herein.

The embodiments of the present disclosure also provide a transmission system, which performs data or signaling transmission through a radio bearer F1 interface to perform the above operations.

The embodiments of the present disclosure also provide a transmission system, which performs data or signaling transmission through a radio bearer NG interface to perform the above operations.

The embodiments of the present disclosure also provide a satellite communication system, which includes any one of the above transmission systems.

It is apparent that a person skilled in the art shall understand that all of the above-mentioned modules or operations in the present disclosure may be implemented by using a general calculation apparatus, may be centralized on a single calculation apparatus or may be distributed on a network composed of multiple calculation apparatuses. In some exemplary implementations, they may be implemented by using executable program codes of the calculation apparatuses. Thus, they may be stored in a storage apparatus and executed by the calculation apparatuses, the shown or described operations may be executed in a sequence different from this sequence under certain conditions, or they are manufactured into each integrated circuit module respectively, or multiple modules or operations therein are manufactured into a single integrated circuit module. Thus, the present disclosure is not limited to the combination of any specific hardware and software.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

INDUSTRIAL APPLICABILITY

As described above, the link determination method and apparatus, the link establishment method and apparatus, the transmission system, and the satellite communication system provided by the embodiments of the disclosure have the following beneficial effects: the technical problem in the related art that once the transmission of data and signaling over a feeder transmission link has an error or becomes inefficient, all the transmission performance associated with the subsequent service link becomes meaningless may be solved, thereby improving the stability of the data and signaling transmission of the whole system, and enhancing the robustness and the data signaling transmission efficiency of the related interface connection of mobile network nodes.

What is claimed is:

1. A link determination method, comprising:
    receiving, by a ground serving base station of User Equipment (UE) from an air serving base station of the UE, link information of a primary link and configuration information of the air serving base station, wherein the primary link is a link between the ground serving base station and the air serving base station;
    determining, by the ground serving base station, at least one cooperative base station of the UE and feature information of at least one secondary link according to the link information of the primary link and the configuration information of the air serving base station, wherein the secondary link is a link among the air serving base station, the cooperative base station and the ground serving base station; and
    sending, by the ground serving base station to the air serving base station and the at least one cooperative base station, indication information for establishing the at least one secondary link, the link information of the primary link, and configuration information of the ground serving base station.

2. The method according to claim 1, wherein determining, by the ground serving base station, the at least one cooperative base station of the UE and the feature information of the at least one secondary link comprises at least one of:
    judging, by the ground serving base station, whether link quality in the link information of the primary link meets a first quality threshold; and
    in a case where the judgment result is negative, determining, by the ground serving base station, a ground cooperative base station and a first secondary link between the air serving base station and the ground cooperative base station;
    judging, by the ground serving base station, whether link quality in the link information of the primary link meets a second quality threshold, wherein the link quality corresponding to the second quality threshold is independent of and different from link quality corresponding to a first quality threshold; and in a case where the judgment result is negative, determining, by the ground serving base station, an air cooperative base station and a second secondary link between the air serving base station and the air cooperative base station.

3. The method according to claim 1, further comprising:
    determining, by the ground serving base station, a data or signaling transmission mode in the primary link and the at least one secondary link according to the link information of the primary link and the configuration information of the air serving base station.

4. The method according to claim 3, wherein
    sending, by the ground serving base station to the air serving base station and the at least one cooperative base station, the indication information for establishing the at least one secondary link comprises:
    sending, by the ground serving base station, configuration information of the at least one cooperative base station and the data or signaling transmission mode to the air serving base station;
    or,
    sending, by the ground serving base station to the at least one cooperative base station, the indication information for establishing the at least one secondary link further comprises: sending, by the ground serving base station, the configuration information of the air serving base station to the at least one cooperative base station.

5. The method according to claim 3, wherein the data or signaling transmission mode comprises one of the following:
    a duplicated transmission mode for instructing the air serving base station to simultaneously perform data or signaling transmission on the primary link and the at least one secondary link; and a switched transmission mode for instructing the air serving base station to select a link with highest link quality from the primary link and the at least one secondary link for data or signaling transmission.

6. The method according to claim 1, wherein in a case where the ground serving base station receives secondary link establishment failure information fed back by the air serving base station or the at least one cooperative base station, the method further comprises:
   determining, by the ground serving base station, at least one standby cooperative base station according to secondary link service quality information of the at least one cooperative base station; and
   sending, by the ground serving base station to the air serving base station and the at least one standby cooperative base station, indication information for establishing at least one secondary link.

7. A link determination apparatus, located in a ground serving base station of User Equipment (UE), and comprising a memory storing instructions and a processor in communication with the memory, wherein the processor is configured to execute the instructions to perform the method according to claim 1.

8. A link establishment method, comprising:
   sending, by an air serving base station of User Equipment (UE) to a ground serving base station of the UE, link information of a primary link and configuration information of the air serving base station, wherein the primary link is a link between the ground serving base station and the air serving base station;
   receiving, by the air serving base station, link information of the primary link, configuration information of the ground serving base station, and indication information sent by the ground serving base station;
   establishing, by the air serving base station according to the indication information sent by the ground serving base station, at least one secondary link with at least one cooperative base station and the ground serving base station; and
   performing, by the air serving base station, data or signaling transmission through the primary link and/or the at least one secondary link.

9. The method according to claim 8, wherein the indication information at least comprises configuration information of the at least one cooperative base station, and establishing, by the air serving base station according to the indication information sent by the ground serving base station, the at least one secondary link with the at least one cooperative base station comprises:
   sending, by the air serving base station according to the configuration information of the at least one cooperative base station, a request for establishing the at least one secondary link to the at least one cooperative base station; and
   after receiving a successful establishment response fed back by the at least one cooperative base station, establishing, by the air serving base station, the at least one secondary link with the at least one cooperative base station;
   or,
   receiving, by the air serving base station, a request sent by the at least one cooperative base station for establishing the at least one secondary link; and in a case of determining that the at least one cooperative base station meets a preset condition, feeding back, by the air serving base station, a successful establishment response for establishing the at least one secondary link to the at least one cooperative base station, and establishing, by the air serving base station, the at least one secondary link with the at least one cooperative base station.

10. The method according to claim 9, further comprising:
    after receiving a rejection response fed back by the at least one cooperative base station, sending, by the air serving base station, a request for replacing the at least one cooperative base station to the ground serving base station;
    or,
    in a case of determining that the at least one cooperative base station does not meet the preset condition, feeding back, by the air serving base station, a rejection response to the at least one cooperative base station, and sending, by the air serving base station, a request for replacing the at least one cooperative base station to the ground serving base station.

11. The method according to claim 8, wherein establishing, by the air serving base station according to the indication information sent by the ground serving base station, the at least one secondary link with the at least one cooperative base station and the ground serving base station further comprises:
    determining, by the air serving base station, feature information of the at least one cooperative base station according to the indication information; and
    establishing, by the air serving base station according to the feature information of the at least one cooperative base station, the at least one secondary link with the at least one cooperative base station, wherein the feature information of the at least one cooperative base station at least comprises a type and the number of the at least one cooperative base station.

12. The method according to claim 11, further comprising:
    in a case where the type of the cooperative base station is a ground cooperative base station, establishing, by the air serving base station, a first secondary link with the ground cooperative base station; and
    in a case where the type of the cooperative base station is an air cooperative base station, establishing, by the air serving base station, a second secondary link with the ground air cooperative base station.

13. The method according to claim 8, wherein establishing, by the air serving base station according to the indication information sent by the ground serving base station, the at least one secondary link with the at least one cooperative base station and the ground serving base station further comprises:
    determining, by the air serving base station, a data or signaling transmission mode according to the indication information;
    performing, by the air serving base station, the data or signaling transmission through the primary link and/or the at least one secondary link comprises:
    in a case where the data or signaling transmission mode is a duplicated transmission mode, simultaneously performing, by the air serving base station, data or signaling transmission with the at least one cooperative base station on the primary link and the at least one secondary link; and
    in a case where the data or signaling transmission mode is a switched transmission mode, selecting, by the air serving base station, a link with highest link quality from the primary link and the at least one secondary link for data or signaling transmission.

14. A link establishment apparatus, located in an air serving base station of User Equipment (UE), and comprising a memory storing instructions and a processor in communication with the memory, wherein the processor is configured to execute the instructions to perform the method according to claim 8.

\* \* \* \* \*